US011212954B2

(12) United States Patent
Maeder et al.

(10) Patent No.: US 11,212,954 B2
(45) Date of Patent: Jan. 4, 2022

(54) APPARATUS AND METHODS FOR FIELD OPERATIONS BASED ON HISTORICAL FIELD OPERATION DATA

(71) Applicant: Deere & Company, Moline, IL (US)

(72) Inventors: Curtis A. Maeder, Johnston, IA (US); Qiang R. Liu, Urbandale, IA (US); Terence D. Pickett, Waukee, IA (US); Jeffery J. Adams, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 184 days.

(21) Appl. No.: 16/406,830

(22) Filed: May 8, 2019

(65) Prior Publication Data
US 2020/0352082 A1 Nov. 12, 2020

(51) Int. Cl.
A01B 69/04 (2006.01)
A01B 69/00 (2006.01)
A01B 79/00 (2006.01)

(52) U.S. Cl.
CPC .......... A01B 69/008 (2013.01); A01B 69/001 (2013.01); A01B 79/00 (2013.01)

(58) Field of Classification Search
CPC ... A01B 69/001; A01B 69/007; A01B 69/008; A01B 79/00; A01B 79/005; G05D 2201/0201; G05D 1/0212; G05D 1/0274
USPC .......................................................... 701/50
See application file for complete search history.

(56) References Cited

U.S. PATENT DOCUMENTS 6,236,916 B1    5/2001  Staub et al.
8,010,261 B2    8/2011  Brubaker
10,188,029 B1 *  1/2019  Brown ................. G05D 1/0278
10,936,871 B2 *  3/2021  Tran ...................... B64C 39/024
11,076,589 B1 *  8/2021  Sibley ...................... A01G 7/06
2006/0178820 A1 *  8/2006  Eglington ............ G01C 21/005
                                                                      701/533
(Continued)

FOREIGN PATENT DOCUMENTS

CA    3065154 A1 * 12/2018    ........... A01D 34/008
CA    3010357 A1 *  2/2019    ........... F16M 11/046
(Continued)

OTHER PUBLICATIONS

European Search Report issued in counterpart application No. 20173207.0 dated Oct. 5, 2020 (07 pages).

Primary Examiner — Atul Trivedi
(74) Attorney, Agent, or Firm — Hanley, Flight & Zimmerman, LLC

(57) ABSTRACT

Methods, apparatus, systems and articles of manufacture are disclosed for field operations based on historical field operation data. An example apparatus disclosed herein includes a guidance line generator to generate a guidance line for operation of a vehicle during a second operation on a field, the guidance line based on (1) a field map generated from location data collected during a first operation in the field, the field map including a plurality of crop rows and (2) an implement of the vehicle, the implement to perform the second operation on the field. The example apparatus further includes a drive commander to cause the vehicle to traverse the field along the guidance line, and an implement commander to cause the implement to perform the second operation as the vehicle traverses the field along the guidance line.

26 Claims, 11 Drawing Sheets

(56) References Cited

U.S. PATENT DOCUMENTS

| | | | |
|---|---|---|---|
| 2006/0178823 A1* | 8/2006 | Eglington | G05D 1/0278 701/414 |
| 2006/0178825 A1* | 8/2006 | Eglington | G05D 1/0278 701/410 |
| 2006/0200294 A1 | 9/2006 | Scheufler et al. | |
| 2007/0021913 A1* | 1/2007 | Heiniger | A01B 69/008 701/412 |
| 2007/0083299 A1* | 4/2007 | Lindores | G05D 1/0278 701/2 |
| 2008/0065286 A1 | 3/2008 | Han et al. | |
| 2008/0105177 A1* | 5/2008 | Dix | A01C 7/087 111/200 |
| 2008/0249692 A1* | 10/2008 | Dix | G01C 21/00 701/50 |
| 2009/0037058 A1 | 2/2009 | Senneff et al. | |
| 2009/0118904 A1* | 5/2009 | Birnie | G01C 21/00 701/41 |
| 2010/0017075 A1* | 1/2010 | Beaujot | A01B 69/008 701/50 |
| 2012/0101634 A1* | 4/2012 | Lindores | A01B 79/005 700/266 |
| 2012/0109614 A1* | 5/2012 | Lindores | G06K 9/00657 703/11 |
| 2014/0012732 A1* | 1/2014 | Lindores | G06Q 50/02 705/37 |
| 2014/0236431 A1 | 8/2014 | Hendrickson et al. | |
| 2014/0254861 A1* | 9/2014 | Nelson, Jr. | G05D 1/0246 382/100 |
| 2015/0321694 A1* | 11/2015 | Nelson, Jr. | G06K 9/00791 382/104 |
| 2016/0019560 A1* | 1/2016 | Benkert | G06Q 30/0201 700/284 |
| 2016/0057920 A1* | 3/2016 | Spiller | G01C 21/00 701/23 |
| 2016/0165795 A1* | 6/2016 | Balutis | G05D 1/0265 701/25 |
| 2017/0090068 A1* | 3/2017 | Xiang | G01N 33/0098 |
| 2017/0127606 A1* | 5/2017 | Horton | A01C 5/06 |
| 2017/0169523 A1* | 6/2017 | Xu | G06Q 10/06315 |
| 2017/0270446 A1* | 9/2017 | Starr | G06Q 10/06313 |
| 2017/0293304 A1* | 10/2017 | Dang | G05D 1/021 |
| 2017/0300064 A1* | 10/2017 | Wolters | G05D 1/0217 |
| 2018/0012347 A1* | 1/2018 | Jens | G06T 7/0012 |
| 2018/0164117 A1* | 6/2018 | Sakaguchi | G05D 1/0219 |
| 2018/0325012 A1* | 11/2018 | Ferrari | A01B 69/008 |
| 2018/0359904 A1* | 12/2018 | Foster | G05D 1/0223 |
| 2019/0170860 A1* | 6/2019 | Burke | G01S 7/4808 |
| 2019/0230850 A1* | 8/2019 | Johnson | G05D 1/0088 |
| 2019/0259108 A1* | 8/2019 | Bongartz | A01C 21/005 |
| 2019/0289769 A1* | 9/2019 | Antich | G05D 1/0274 |
| 2019/0289779 A1* | 9/2019 | Koch | A01C 7/10 |
| 2019/0325534 A1* | 10/2019 | Perry | G06Q 10/087 |
| 2019/0369640 A1* | 12/2019 | He | G01S 19/485 |
| 2020/0029487 A1* | 1/2020 | Dix | G05D 1/0212 |
| 2020/0037491 A1* | 2/2020 | Schoeny | A01B 79/005 |
| 2020/0053961 A1* | 2/2020 | Dix | A01D 41/141 |
| 2020/0053962 A1* | 2/2020 | Dix | G05D 1/0278 |
| 2020/0355667 A1* | 11/2020 | Schoeny | A01B 15/16 |
| 2020/0383262 A1* | 12/2020 | Schoeny | A01C 7/006 |
| 2020/0383263 A1* | 12/2020 | Rice | G06K 7/10386 |
| 2020/0390022 A1* | 12/2020 | Stanhope | A01B 69/001 |
| 2020/0390025 A1* | 12/2020 | Schoeny | A01C 7/205 |
| 2021/0000006 A1* | 1/2021 | Ellaboudy | G06K 9/4661 |
| 2021/0000013 A1* | 1/2021 | Robertson | B25J 15/0019 |
| 2021/0064050 A1* | 3/2021 | Pickett | G05D 1/0278 |
| 2021/0146543 A1* | 5/2021 | Cristache | B25J 9/162 |
| 2021/0265066 A1* | 8/2021 | Berg | G06K 9/6215 |

FOREIGN PATENT DOCUMENTS

| | | | | |
|---|---|---|---|---|
| CA | 3010410 A1 | * | 2/2019 | ........... A01B 69/008 |
| CA | 3105725 A1 | * | 1/2020 | ........... A01B 69/008 |
| CN | 108170084 A | * | 6/2018 | |
| CN | 108170104 A | * | 6/2018 | ............. A01B 51/02 |
| DE | 102016216740 A1 | * | 3/2017 | ............. H04W 4/029 |
| DE | 202020000626 U1 | * | 5/2020 | ............. G09B 23/06 |
| EP | 3363273 A1 | * | 8/2018 | ............. A01B 69/00 |
| EP | 3400798 A1 | * | 11/2018 | ............. A01B 69/001 |
| EP | 3400798 A1 | | 11/2018 | |
| EP | 3729940 A1 | * | 10/2020 | ........... A01B 79/005 |
| JP | 2018038291 A | * | 3/2018 | |
| WO | WO-2014050524 A1 | * | 4/2014 | ............. H04W 4/44 |
| WO | WO-2014111387 A1 | * | 7/2014 | ........... A01B 69/001 |
| WO | WO2016032901 A1 | | 3/2016 | |
| WO | WO-2017061281 A1 | * | 4/2017 | ............. G06T 11/00 |
| WO | WO-2017066078 A1 | * | 4/2017 | ............. A01C 7/102 |
| WO | WO-2018017746 A1 | * | 1/2018 | ............. A01G 7/06 |
| WO | WO-2018101351 A1 | * | 6/2018 | ............. A01D 41/12 |
| WO | WO-2018116769 A1 | * | 6/2018 | ............. A01B 69/00 |
| WO | WO-2018116770 A1 | * | 6/2018 | ............. A01B 69/00 |
| WO | WO-2018116771 A1 | * | 6/2018 | ............. G05D 1/02 |
| WO | WO-2018116772 A1 | * | 6/2018 | ............. A01B 69/00 |
| WO | WO-2019245978 A1 | * | 12/2019 | ........... A01K 29/005 |

* cited by examiner

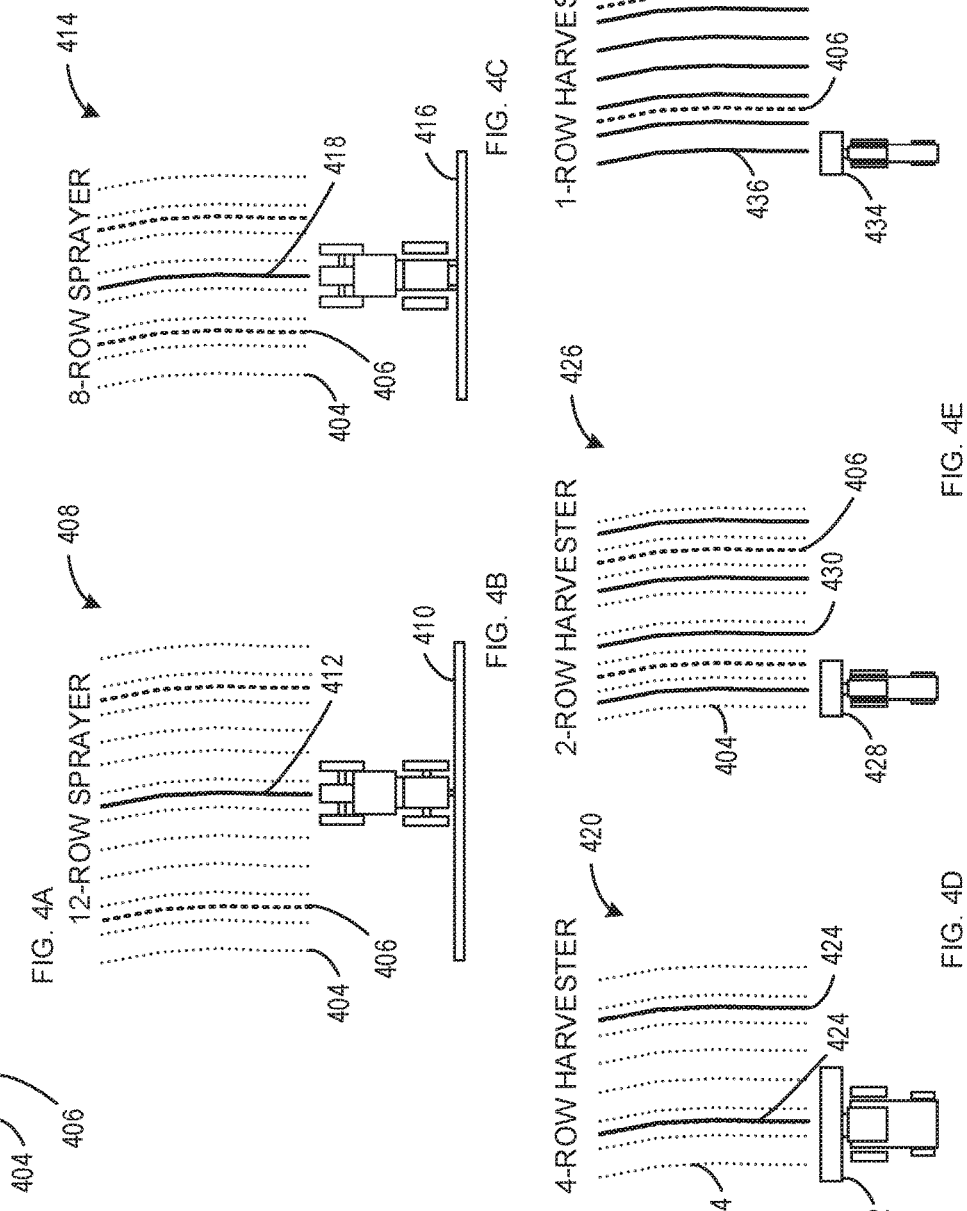

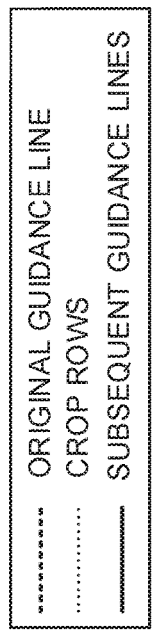
FIG. 5A
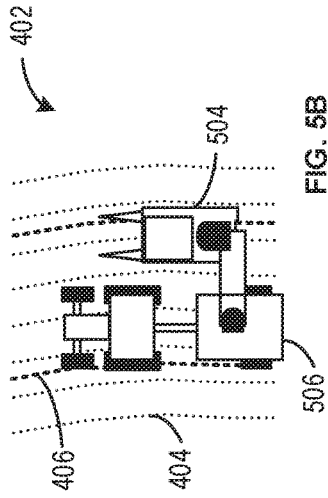
FIG. 5B
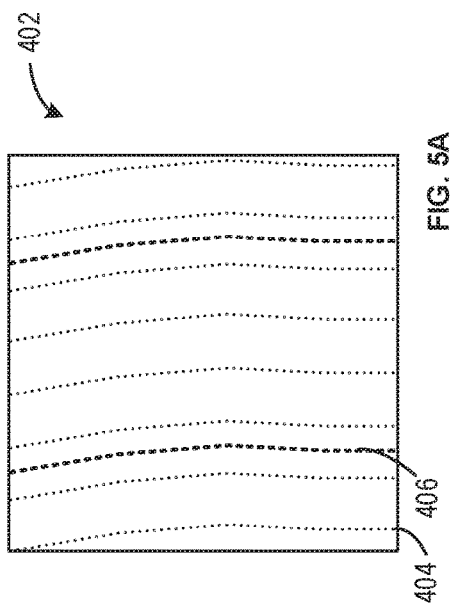
FIG. 5C HARVESTER (1-ROW)
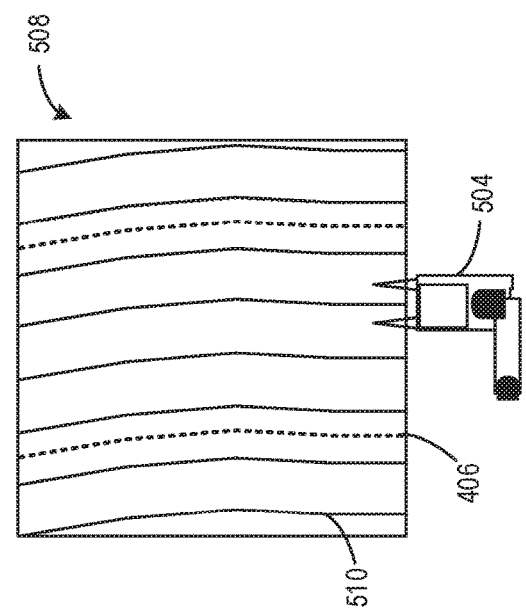
FIG. 5D HAULAGE VEHICLE (1-ROW)

APPARATUS AND METHODS FOR FIELD OPERATIONS BASED ON HISTORICAL FIELD OPERATION DATA

FIELD OF THE DISCLOSURE

This disclosure relates generally to agricultural techniques, and, more particularly, to apparatus and methods for field operations based on historical field operation data.

BACKGROUND

In recent years, agricultural vehicles have become increasingly automated. Agricultural vehicles may perform semi-autonomous or fully-autonomous operations on fields. Agricultural vehicles perform operations using implements including planting implements, spraying implements, harvesting implements, fertilizing implements, strip/till implements, etc.

SUMMARY

An example apparatus disclosed herein includes a guidance line generator to generate a guidance line for operation of a vehicle during a second operation on a field, the guidance line based on (1) a field map generated from location data collected during a first operation in the field, the field map including locations of a plurality of crop rows and (2) an implement of the vehicle, the implement to perform the second operation on the field. The example apparatus further includes a drive commander to cause the vehicle to traverse the field along the guidance line and an implement commander to cause the implement to perform the second operation as the vehicle traverses the field along the guidance line.

An example non-transitory computer readable storage medium disclosed herein includes instructions that, when executed, cause a processor to generate a guidance line for operation of a vehicle during a second operation on a field, the guidance line based on (1) a field map generated from location data collected during a first operation in the field, the field map including locations of a plurality of crop rows and (2) an implement of the vehicle, the implement to perform the second operation on the field. The instructions, when executed, further cause the processor to cause the vehicle to traverse the field along the guidance line, and cause the implement to perform the second operation as the vehicle traverses the field along the guidance line.

An example method disclosed herein includes generating a guidance line for operation of a vehicle during a second operation on a field, the guidance line based on (1) a field map generated from location data collected during a first operation in the field, the field map including locations of a plurality of crop rows and (2) an implement of the vehicle, the implement to perform the second operation on the field. The example method further includes causing the vehicle to traverse the field along the guidance line and causing the implement to perform the second operation as the vehicle traverses the field along the guidance line.

BRIEF DESCRIPTION OF THE DRAWINGS

FIG. 4A is an example field map generated using an example four-row implement.

FIG. 4B is an example first field map traversal schematic using an example twelve-row sprayer in a subsequent operation on the field corresponding to the field map of FIG. 4A.

FIG. 4C is an example second field map traversal schematic using an example eight-row sprayer in a subsequent operation on the field corresponding to the field map of FIG. 4A.

FIG. 4D is an example third field map traversal schematic using an example four-row harvester in a subsequent operation on the field corresponding to the field map of FIG. 4A.

FIG. 4E is an example fourth field map traversal schematic using an example two-row harvester in a subsequent operation on the field corresponding to the field map of FIG. 4A.

FIG. 4F is an example fifth field map traversal schematic using an example one-row harvester in a subsequent operation on the field corresponding to the field map of FIG. 4A.

FIG. 5A is an enlarged view of the example field map of FIG. 4A generated using a four-row implement.

FIG. 5B is an example sixth field map traversal schematic using an example single row harvester with an example haulage vehicle on the field corresponding to the field map of FIG. 5A.

FIG. 5C is an example seventh field map traversal schematic using the example single row harvester of FIG. 5B on the field corresponding to the field map of FIG. 5A.

FIG. 5D is an example eighth field map traversal schematic using the example haulage vehicle of FIG. 5B on the field corresponding to the field map of FIG. 5A.

Figure 1:
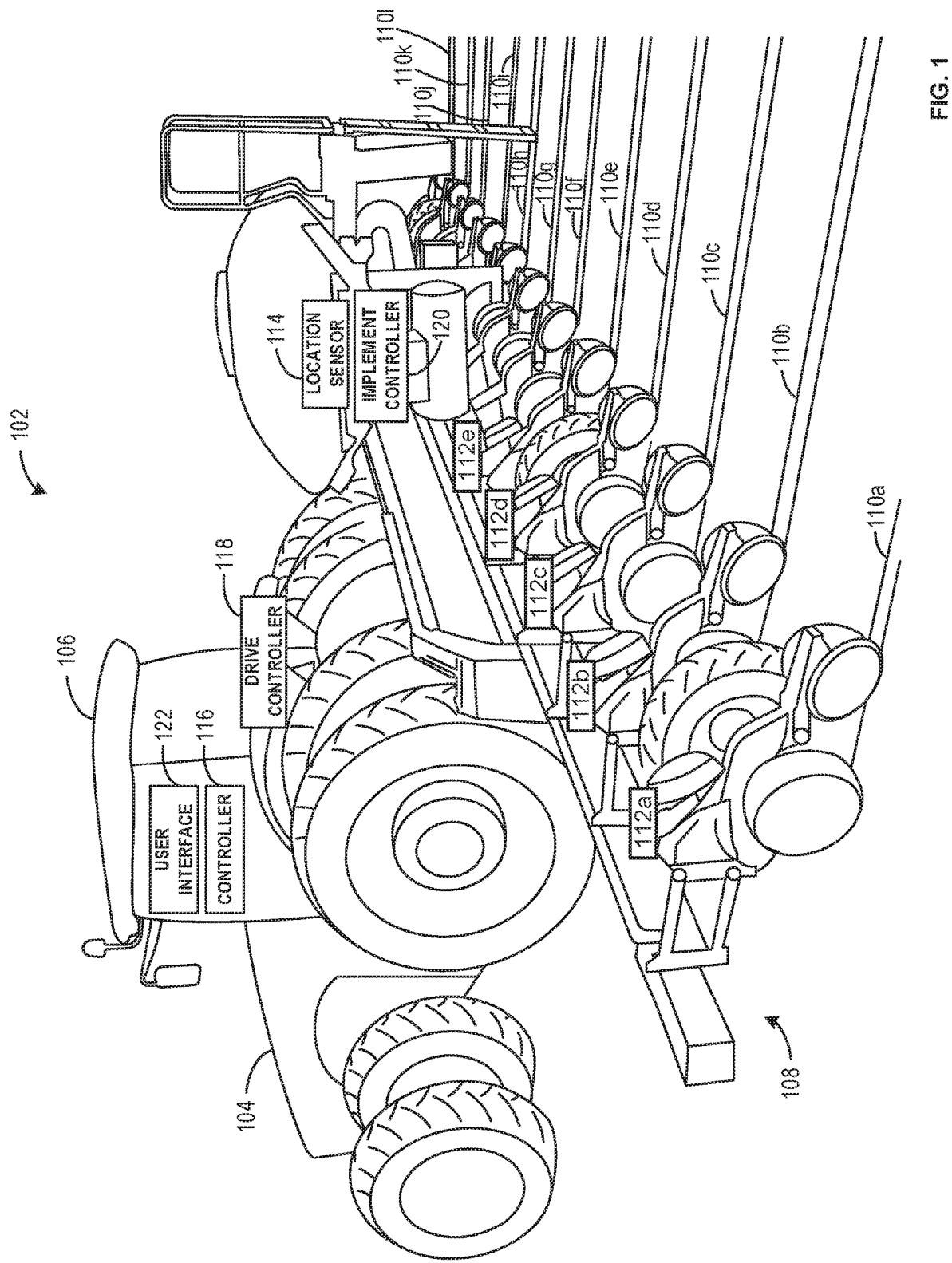
FIG. 1 is a schematic of an example vehicle constructed in accordance with the teachings of this disclosure.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Agricultural vehicles perform numerous operations on fields using different implements. As an example, a planter implement may plant crops at the beginning of a season. A sprayer implement may subsequently spray the crops, and/or a fertilizer implement may subsequently fertilize the crops. Different vehicles may be used for individual operations, or different implements may be attached to a same vehicle (e.g., a tractor) to perform different operations. In some examples, a planting operation, a strip/till operation, or a fertilizer operation may be performed first, followed by a spraying operation, a harvesting operation (e.g., a combine or forage harvester), a side/top dress fertilizing operation, or any other field operation. As used herein, an "operation" can include planting, spraying, fertilizing, and/or performing any other task on a field. In some examples, operations performed on the field are additionally or alternatively referred to as "treatments." Further, performing such operations on a field can be referred to as "operating upon" the field, "treating" the field, or "working" the field. In some examples, an operation may include installation of permanent assets, such as beds or drip irrigation lines. While example orderings of operations (e.g., planting followed by fertilizing) may be discussed herein, operations may be performed in any order.

Automation of agricultural vehicles is highly commercially desirable, as automation can improve the accuracy with which operations are performed, reduce operator fatigue, improve efficiency, and accrue other benefits. Automated vehicles move by following guidance lines. Conventional guidance lines are generated by defining a first point (e.g., an "A" point) and a second point (e.g., a "B" point) and generating a line or curve connecting the first point and the second point (e.g., an A-B line, or an A-B curve). Automatically generating point-to-point guidance lines across a field dimension fails to account for topography of the field and specific locations of crop rows. Most operations are subsequent operations performed on a field (e.g., most operations are performed on existing crops that are planted in the field).

In conventional automated agricultural vehicle systems, subsequent operations may be manually performed by an operator or automatically performed while accepting damage to the crop rows. In manual operations, the operator analyzes the crop rows and attempts to position the agricultural vehicle to operate on the crop rows to minimize damage to crops or waste of product (e.g., spray, fertilizer, etc.). In some conventional examples, subsequent field operations are performed automatically based on planned or expected crop row locations. However, due to sources of error, such as estimation of implement drift in curved paths, drift due to slopes in the terrain, uneven draft loads across the width of an implement which cause the implement to pull off-center, disturbances due to soil surface roughness, and/or other sources of error, planned crop row locations are often significantly different than actual crop row locations.

In some conventional implementations, agricultural vehicle systems attempt to sense locations of crop rows as they operate. However, such real-time sensing is insufficient to avoid crop damage, and fails to reliably address unique crop row locations. Further, to ensure all crops are operated upon (sprayed, fertilized, etc.), conventional agricultural vehicle systems may utilize an overlap, where crop rows at the edge of the implement get operated upon twice in two successive passes, resulting in inefficiency and waste.

When a planting operation is performed, after completing planting of one set of rows (e.g., one-pass of the field in a direction), the planter must return in a new pass in the opposite direction. To begin a new set of rows, the operator must estimate a starting position for the first row at an end of the planting implement. Specifically, the operator must try and line up the vehicle such that the first new row is spaced apart from the nearest existing crop row at the same spacing as exists between the rest of the rows. Such edge rows are referred to as "guess rows," since the operator must guess the appropriate spacing to plant the crop row. This is a very challenging task, which often results in the first row having too narrow a gap relative to the nearest existing row, or too large a gap. In subsequent operations, due to the irregularity of guess rows, an operator may have difficulty performing an operation on the guess rows. Additionally, the size of the guess row can vary from pass to pass (e.g., between traversals) over the field, introducing additional variability that makes subsequent operations increasingly difficult. In some conventional implementations, an operator will merely drive over and sacrifice these "guess rows" during subsequent operations.

Further, in conventional agricultural systems, differences between operational widths of implements complicate determination of driving paths. For example, if a twelve-row planter is utilized to plant the crops, following the same guidance lines used with the twelve-row planter when using a sixteen-row cultivator/side-dress rig for a fertilization operation will result in crop rows that are not sprayed. Farmers will often have a plurality of implements with different widths, and thus operators must manually determine driving paths that are appropriate based on the unique crop rows on the field and unique implement widths. Further, even when the operational width of an implement in a subsequent operation is different than the operational width of the implement in an original operation, utilizing the same original guidance lines in the subsequent operation fails to account for the actual crop row locations (e.g., the crop rows may not be predictably spaced around the original guidance line due to implement drift).

Example methods, apparatus, systems, and articles of manufacture (e.g., physical storage media) disclosed herein generate guidance lines for automatic execution of subsequent operations on a field based on field maps determined during previous operations. Some examples disclosed herein generate field maps based on location data (e.g., GPS and inertial data) and sensor data from implements to accurately represent crop rows in field maps. Example methods, apparatus, systems, and articles of manufacture (e.g., physical storage media) disclosed herein enable accurate navigation along guidance lines to accurately operate upon a field regardless of the terrain of the field and/or the size of implement utilized. Examples disclosed herein accurately operate upon guess rows by generating guidance lines specific to locations of the guess rows, eliminating potential operator error.

Performing subsequent operations based on field maps improves alignment relative to established row locations and minimizes damage to crops, as the wheels of the agricultural vehicle can be positioned to avoid running over rows. Further, utilizing the automated guidance techniques disclosed herein, fields can be operated upon (e.g., harvested, sprayed, fertilized, etc.) faster since the guidance system can anticipate upcoming changes in the terrain and/or changes in crop row locations, rather than relying upon an operator to make adjustments and/or a sensor to sense changes in the terrain. Additionally, some crops, such as corn, require highly precise positioning of the implement (e.g., a harvesting head, a platform for small grain harvesting, etc.) during harvesting. Utilization of accurate mapping data to generate precise guidance lines helps ensure that crops are operated upon safely and efficiently.

Example techniques disclosed herein enable an operator to begin a subsequent operation at any location in a field, as mapping data can be utilized to automatically generate guidance lines for any location. Further, example techniques disclosed herein enable a coordinated work system in which a plurality of agricultural vehicles complete an operation by each generating guidance lines based off shared mapping data and knowledge of other vehicles' planned operations. Similarly, a plurality of agricultural vehicles can generate the field map during an initial operation (e.g., a planting operation).

Example techniques disclosed herein further utilize individual section and/or nozzle control to ensure that if a portion of the implement is passing over a crop row which has already been operated upon (e.g., already sprayed), this portion of the implement does not perform a redundant operation.

FIG. 1 is a schematic of an example vehicle 102 constructed in accordance with the teachings of this disclosure. The example vehicle 102 includes an example main body 104 including an example cab 106 from which an operator can operate the vehicle 102. In some examples wherein the vehicle 102 is autonomous, the vehicle 102 may not include the cab 106.

The vehicle 102 further includes an example implement 108. In the illustrated example of FIG. 1, the implement 108 is a planting implement. Specifically, the implement 108 is a twelve-row planter. The implement 108 plants crops in example crop rows 110a-l. The implement 108 may be separable from the vehicle 102, and exchanged with another implement of a same or different implement type. For example, the implement may be a sprayer implement, a fertilizer implement, a tilling implement, a harvesting implement, and/or any other type of implement to perform an operation on a field. In some examples, the implement 108 is not separable from the vehicle 102, and multiple vehicles may be used to perform different operations on a field. While the implement 108 of FIG. 1 is a twelve row planter, the implement 108 may have any operational width (e.g., four rows, eight rows, sixteen rows, etc.). The operational width of the implement 108 defines the number of rows that can be operated upon (e.g., planted, tilled, sprayed, etc.) in a single pass of the vehicle 102 over a field. While the implement 108 of the illustrated example is capable of planting twelve rows simultaneously, in some examples, only some of the rows are planted. For example, if a right-side of the implement 108 is traveling over a portion of a field that has already been planted, the corresponding rows of the implement 108 may be disabled to prevent performing a repeat operation.

Individual row portions of the implement 108 of the illustrated example of FIG. 1 include example implement sensors 112a-l to detect whether the row portions of the implement 108 are performing operations. While only the implement sensors 112a-e are visible due to the angle of the perspective view of FIG. 1, additional implement sensors 112f-l are understood to be mounted to portions of the implement 108 in alignment with crop rows 110f-l. The implement sensors 112a-1 are each positioned on one of the portions of the implement 108 to detect whether operations are performed on individual rows. In some examples, the implement sensors 112a-1 are switches which activate as a product passes through the implement portion (e.g., as seed exits the implement 108). Any type of sensor may be utilized to determine whether a portion of the implement 108 corresponding to a specific row is performing an operation. The implement sensors 112a-1 communicate with an example controller 116.

The implement 108 of the illustrated example of FIG. 1 includes an example location sensor 114. The location sensor 114 of the illustrated example is a global positioning system (GPS) sensor combined with an inertial sensor. The inertial sensor enables higher precision location data by enabling compensation for tilt of the vehicle 102. For example, if the vehicle 102 is tilted on a hill, the inertial sensor can compensate for this tilt to enable accurate determination of a location of the vehicle 102, and more specifically, accurate determination of locations of portions of the implement 108. The example location sensor 114 of the illustrated example is mounted to the implement 108 to provide more accurate ground-level location data for subsequent determination of crop row locations. In some examples, the location sensor 114 is mounted to another part of the vehicle 102 (e.g., the main body 104, the cab 106, etc.). In some examples, the location sensor 114 includes multiple location sensors. In some such examples, the vehicle 102 includes the location sensor 114 as a first sensor on the main body 104 to provide a location for the vehicle 102 generally, and a second sensor on the implement 108 to provide ground-level location data. The location sensor 114 communicates to an example controller 116.

The example controller 116 of the illustrated example of FIG. 1 analyzes data from one or more sensors and enables automated operation of the vehicle 102. The controller 116 of the illustrated example generates field maps and utilizes such field maps to automatically generate guidance lines based on the field maps and the type of implement in use by the vehicle 102. The controller 116 accesses implement sensor data from the implement sensors 112a-l and location data from the location sensor 114 to generate field maps. For example, the controller 116 can determine locations of the crop rows 110a-l based on the implement sensor data and the location data. The controller 116 of the illustrated example issues commands to cause movement of the vehicle 102 by commanding an example drive controller 118. Further, the controller 116 of the illustrated example issues commands to cause operation of the implement 108 by commanding an example implement controller 120 to perform an operation based on a field map and a parameter of the implement 108. The controller 116 of the illustrated example further controls an example user interface 122, which can provide mapping data to an operator and solicit input from the operator. Further detail pertaining to the controller 116 is illustrated and described in association with FIG. 2.

The example drive controller 118 of the illustrated example of FIG. 1 causes movement of the vehicle 102. For example, the controller 116 can issue commands to the drive controller 118 for the vehicle 102 to move according to a guidance line generated by the controller 116. In such examples, the drive controller 118 responds to these commands and causes movement of the vehicle 102 (e.g., movement of the wheels, steering adjustments, etc.).

The example implement controller 120 of the illustrated example of FIG. 1 causes the implement 108 to perform an operation on the field. For example, the implement controller 120 can cause the implement 108 to plant, spray, harvest, and/or perform any other operation. In some examples, the implement controller 120 causes portions of the implement 108 to perform an operation, based on data from the controller 116 indicating that some of the rows under the implement 108 have already been operated upon (e.g., as determined based on mapping data). In some examples, the drive controller 118 and/or the implement controller 120 may be integrated into the controller 116.

Figure 2:
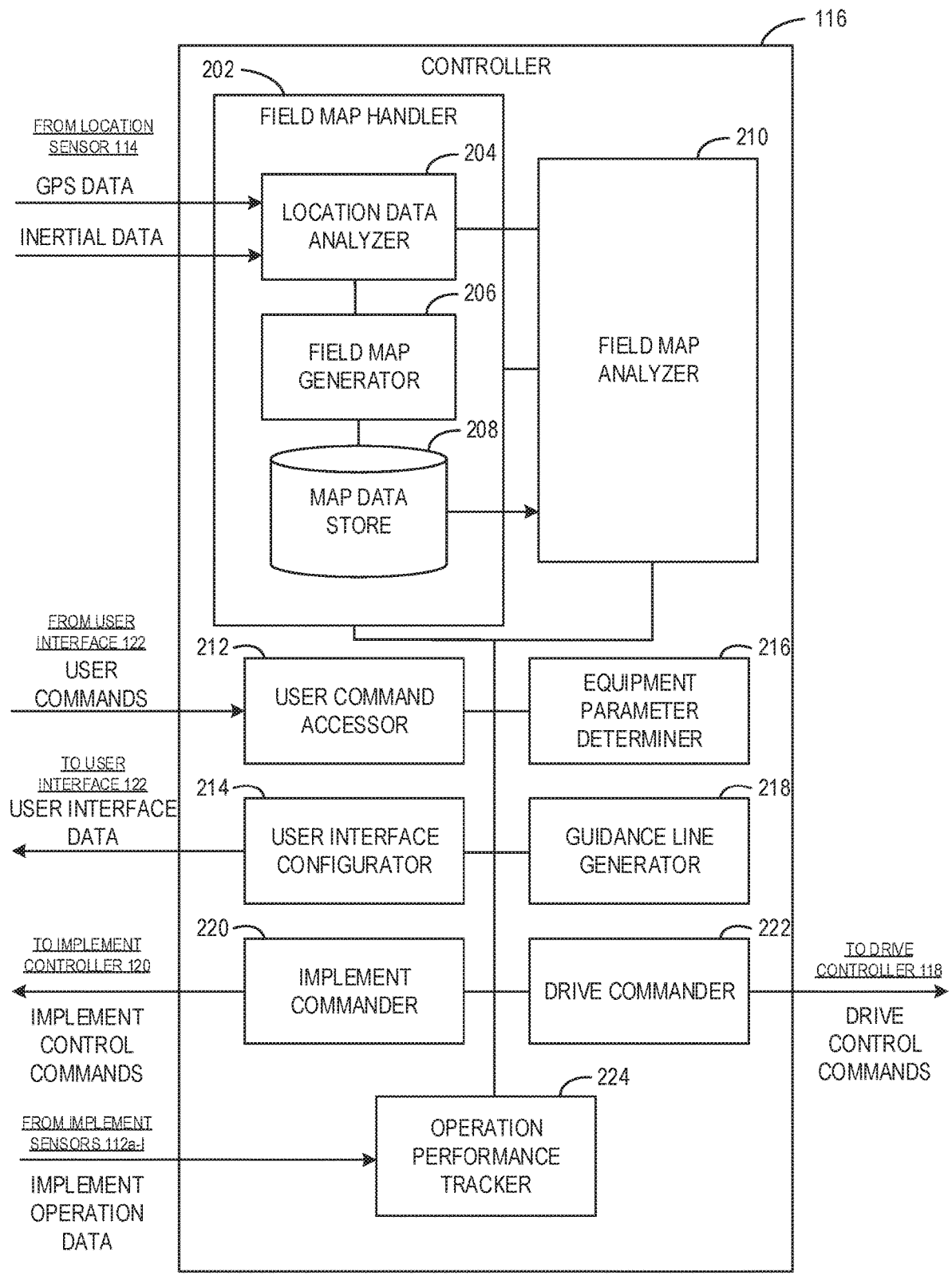
FIG. 2 is a schematic of an example controller of the vehicle of FIG. 1.

FIG. 2 is a schematic of the controller 116 of the vehicle 102 of FIG. 1. The controller 116 includes an example field map handler 202, an example location data analyzer 204, an example field map generator 206, an example map data store 208, an example field map analyzer 210, an example user command accessor 212, an example user interface configurator 214, an example equipment parameter determiner 216, an example guidance line generator 218, an example implement commander 220, an example drive commander 222, and an example operation performance tracker 224.

The example field map handler 202 of the illustrated example of FIG. 2 analyzes location data and generates and stores field maps based on the location data. The field map handler 202 receives GPS data and/or inertial data from the location sensor 114. If a field map already exists for a location indicated in the location data (e.g., indicating the current operation is a subsequent operation), then the field map handler 202 can pass the location data (e.g., the GPS data and/or the inertial data) to the field map analyzer 210, which can retrieve the field map from the map data store 208. Conversely, if a map has not been generated, the field map generator 206 can generate a new field map based on the location data. The field map handler 202 of the illustrated example includes an example location data analyzer 204, an example field map generator 206, and an example map data store 208.

The example location data analyzer 204 of the illustrated example of FIG. 2 analyzes location data from the location sensor 114. In some examples, the location data analyzer 204 receives GPS data and inertial data from the location sensor 114, and analyzes the GPS data and inertial data to determine precise locations of the vehicle 102 and/or the implement 108. In some examples, the location data from the location sensor 114 already directly indicates locations of the vehicle 102 and/or the implement 108. The location data analyzer 204 of the illustrated example determines, based on the location data, locations of portions of the implement 108 corresponding to individual ones of the crop rows 110. In some examples, the location data analyzer 204 queries the map data store 208 to determine whether a field map exists for the current location of the vehicle 102. In some examples, the location data analyzer 204 determines whether a field map exists within a specified time period (e.g., a field map from the past six months, a field map from the past year, etc.), as outdated maps (outside the time period) may no longer be accurate if a field has been re-planted. In some examples, the location data analyzer 204 communicates location data to the field map analyzer 210 if a field map corresponding to the location data already exists.

The example field map generator 206 of the illustrated example of FIG. 2 generates field maps based on location data from the location sensor 114. In some examples, the location data analyzer 204 analyzes the location data to determine locations of the vehicle 102 and/or portions of the implement 108, which are then received by the field map generator 206. The field map generator 206 of the illustrated example creates a new map when location data is received for a location for which no map data, or no recent map data (e.g., from the current agricultural season) exists. The field map generator 206 of the illustrated example stores (a) location data including the guidance line which the vehicle 102 followed while performing the initial operation (e.g., planting, tilling, etc.), (b) locations of portions of the implement 108 during the operation, and/or (c) as data from the implement sensors 112a-l indicating whether an operation was performed by portions of the implement 108.

In some examples, the operation performance tracker 224 updates the field map generated by the field map generator 206 based on data from the implement sensors 112a-l. For example, the operation performance tracker 224 may indicate that three portions of the implement 108 were not utilized during a pass through a field. In some such examples, the field map generator 206 updates the field map to indicate the operation did not occur on the crop rows corresponding to these three portions of the implement 108 during the specified pass through the field. Therefore, the field map generated by the field map generator 206 can indicate (a) precise locations (e.g., accounting for displacements in all three-axes) of the vehicle's guidance line that was followed during an initial operation, (b) precise locations of portions of the implement 108 corresponding to crop rows, and/or (c) indications of whether portions of the implement 108 were utilized during the initial operation.

The field map generator 206 stores the field map in the map data store 208 and/or another location accessible to the controller 116. In some examples, field maps may be stored at a location accessible via a network, thereby enabling multiple vehicles to access field maps (e.g., in case multiple vehicles perform a coordinated operation, in case different vehicles are utilized in subsequent operations, etc.).

In some examples where an operation is executed by multiple vehicles in coordination, the field map generator 206 may combine mapping data (e.g., location data, implement operation data, etc.) from multiple vehicles into a common map for a field. In some such examples, the field map generator 206 may be implemented on a network and/or at a central computing system. In some examples, the field map generator 206 of one vehicle, such as the vehicle 102, serves as a primary field map generator when multiple vehicles are performing a coordinated operation. In some examples, individual vehicles performing a coordinated operation may calculate guidance lines and perform other guidance calculations independently, but based upon the same set of rules, such that the vehicles operate predictably and will be coordinated in performing the operation.

The map data store 208 of the illustrated example of FIG. 2 stores field maps, which can be subsequently accessed to enable automated operation of the vehicle 102 (e.g., via generation and utilization of accurate, crop row-specific guidance lines). In some examples, the map data store 208 is accessible via a network. The map data store 208 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a nonvolatile memory (e.g., flash memory). The map data store 208 may additionally or alternatively be implemented by one or more double data rate (DDR) memories, such as DDR, DDR2, DDR3, mobile DDR (mDDR), etc. The map data store 208 may additionally or alternatively be implemented by one or more mass storage devices such as hard disk drive(s), compact disk drive(s) digital versatile disk drive(s), etc. While in the illustrated example the map data store 208 is illustrated as a single database, the map data store 208 may be implemented by any number and/or type(s) of databases. Furthermore, the data stored in the map data store 208 may be in any data format such as, for example, binary data, comma delimited data, tab delimited data, structured query language (SQL) structures, etc. The location data analyzer 204, the field map generator 206, the field map analyzer 210, and/or the operation performance tracker 224 may access and/or modify field maps stored in the map data store 208.

The example field map analyzer 210 of the illustrated example of FIG. 2 analyzes field maps stored in the map data store 208. The field map analyzer 210 can retrieve field maps based on location data from the location data analyzer 204. The field map analyzer 210 can retrieve field maps for any location in a field, thereby enabling the guidance line generator 218 to generate guidance lines at any location. Therefore, the field map analyzer 210 enables the vehicle 102 to begin an operation at any location in a field and accurately operate on the field based on precise locations of the crop rows 110a-1 represented in the field map. The field map analyzer 210 of the illustrated example determines crop row locations based on field maps retrieved from the map data store 208. In some examples where multiple vehicles perform a coordinated operation, the field map analyzer 210 determines appropriate portions of a field map to communicate with individual vehicles executing operations on portions of the field.

The example user command accessor 212 of the illustrated example of FIG. 2 accesses commands issued by an operator. For example, the user command accessor 212 can receive commands entered by an operator via the user interface 122. The user command accessor 212 can receive commands to perform various tasks, such as initiating or terminating an automated operation on a field, manually adjusting guidance lines for the vehicle 102 to travel along, initiating or terminating collection of data (e.g., location data, operation performance data, etc.), manually adjusting a setting of the implement (e.g., a spray power, a harvest speed, etc.), and/or any other tasks associated with operation of the vehicle 102. The user command accessor 212 analyzes command(s) entered by an operator and causes implementation of the command(s). For example, if an operator enters a command to cease all data collection, the user command accessor 212 can communicate with the operation performance tracker 224 to cease analysis and storage of implement operation data and the location data analyzer 204 to cease analysis and storage of location data (e.g., GPS data, inertial data, etc.). Example commands which may be received at the user command accessor 212 include those that may be issued from the run screen 702 illustrated and described in association with FIG. 7.

The example user interface configurator 214 of the illustrated example of FIG. 2 configures the user interface 122. For example, the user interface configurator 214 can communicate data and/or images to be displayed on the user interface 122. In some examples, the user interface configurator 214 communicates map data from the field map analyzer 210 and/or the map data store 208 to the user interface configurator 214 to cause the user interface 122 to display a field map, crop row locations, and/or other data included in a field map. In some examples, the user interface configurator 214 accesses guidance lines generated by the guidance line generator 218 and causes the user interface 122 to display the guidance lines over the field map for a specific operation (e.g., planting, cultivating, spraying, etc.). In some examples, the user interface configurator 214 communicates operation performance data from the operation performance tracker 224 to be displayed on the user interface 122. In some such examples, the user interface 122 may display color and/or shading indicating areas in which an operation has been performed. An example user interface configured by the user interface configurator 214 is illustrated and described in association with FIG. 7.

The example equipment parameter determiner 216 of the illustrated example of FIG. 2 determines parameters of the implement 108. For example, the equipment parameter determiner 216 may determine a type of the implement 108 (e.g., harvester, sprayer, planter, etc.), an operational width of the implement 108 (e.g., one-row, four-rows, eight-rows, etc.), and/or any other parameters for the implement 108. In some examples, the equipment parameter determiner 216 automatically receives data from the implement 108 when the implement 108 is connected to the vehicle 102. In some examples, the user command accessor 212 accesses commands including parameters association with the implement 108. For example, an operator may input a type and/or width of the implement into the user interface 122, which can then be accessed by the user command accessor 212 and communicated to the equipment parameter determiner 216.

In some examples, the equipment parameter determiner 216 communicates with the guidance line generator 218 to enable generation of guidance lines that are specific to parameters of the implement 108. For example, if a field to be operated upon includes thirty-six rows according to the field map as analyzed by the field map analyzer 210, and the equipment parameter determiner 216 determines that the implement 108 can operate on four rows at a time, the guidance line generator 218 may cause nine guidance lines to be generated to ensure all rows are operated upon.

The example guidance line generator 218 of the illustrated example of FIG. 2 generates guidance lines that are specific to the implement 108 attached to the vehicle 102 and/or specific to the field map corresponding to a current field being operated upon. The guidance line generator 218 of the illustrated example generates guidance lines to ensure the vehicle 102 moves along a path that allows the implement 108 to perform its designated operation (e.g., planting, spraying, fertilizing, etc.) most efficiently. For example, the guidance line generator 218 generates as few guidance lines as possible to cover an entire field. In some examples, the guidance line generator 218 generates guidance lines to avoid wheels of the vehicle 102 or wheels of the implement 108 running over crops rows. For example, sugar cane crops are susceptible sustaining significant permanent damage (as it is a perennial crop) if run over. Hence, the guidance line generator 218 of the illustrated example generates guidance lines that ensure accurate, efficient and safe guidance lines for the vehicle 102 to follow when operating autonomously. The equipment parameter determiner 216 receives information pertaining to crop rows identified in field maps by the field map analyzer 210 and information pertaining to equipment parameters from the equipment parameter determiner 216. The guidance line generator 218 outputs guidance lines to the drive commander 222 and the implement commander 220 to enable the drive commander 222 to follow the guidance lines when the vehicle 102 is operating in an autonomous mode, and to enable the implement commander 220 to foresee the route of the vehicle 102 and cause the implement 108 to perform efficient operations (e.g., not repeating operations on rows that are passed over twice). The guidance line generator 218 of the illustrated example communicates the guidance lines to the user interface configurator 214 to enable an operator to view the guidance lines on the user interface 122.

The implement commander 220 of the illustrated example of FIG. 2 causes the implement 108 to perform operations on the field. The implement commander 220 actuates portions of the implement 108 to cause an operation (e.g., planting, tilling, spraying) to be executed by the portions of the implement 108. The implement commander 220 utilizes field map data from the field map analyzer 210 and guidance line data from the guidance line generator 218 to cause portions of the implement 108 to perform operations. For example, if the implement commander 220 receives guidance line data indicating that a centerline of the vehicle 102 will be traveling between rows five and six, the implement commander 220 can reference corresponding field map data from the field map analyzer to determine whether the current operation (e.g., corresponding to the current type of implement) has already been performed on rows that will be passed by the implement 108. In some such examples, the implement 108 can selectively activate portions of the implement 108 to intelligently perform operations on only those rows which have not yet been operated upon. The implement commander 220 of the illustrated example communicates implement control commands to the implement controller 120. In some examples, the implement commander 220 can send implement control commands to the implement controller 120 based on manual operator inputs (e.g., implement controls manually actuated by the operator).

The drive commander 222 of the illustrated example of FIG. 2 issues drive control commands to the drive controller 118 to cause the vehicle 102 to move. In some examples, the drive commander 222 issues the drive control commands to cause the vehicle 102 to move along a guidance line generated by the guidance line generator 218. In some examples, the drive commander 222 issues drive control commands based on user commands input into the user interface 122 (e.g., as accessed by the user command accessor 212) or commands otherwise issued form another control in the cab 106. The drive commander 222 of the illustrated example causes components of the vehicle 102 to adjust to terrain represented in the field map analyzed by the field map analyzer 210 while traversing a guidance line. In some examples, the drive commander 222 may operate autonomously (e.g., cause the vehicle 102 to automatically follow guidance lines generated by the guidance line generator 218), while the implement commander 220 may be manually operated (e.g., may be responsive to manual operator inputs), or vice-versa. In some examples, in a fully automated mode, both the drive commander 222 and the implement commander 220 operate autonomously based on location data, field map data, equipment parameters, guidance lines, and/or implement operation data.

The operation performance tracker 224 of the illustrated example of FIG. 2 analyzes implement operation data from the implement sensors 112a-l. The operation performance tracker 224 of the illustrated example integrates operation performance data into one or more field maps corresponding to a field currently under operation. For example, if the implement operation data indicates that a portion of the crop rows 110a-c was operated upon, the data from the corresponding implement sensors 112a-c can be analyzed by the operation performance tracker 224, and the field map corresponding to a current location (e.g., as determined by the location data analyzer) can be updated to include data indicating these rows have upon operated upon. In such examples, the implement commander 220 can intelligently operate the implement 108 to avoid performing a repeat operation on these rows 110a-c. The operation performance tracker 224 may directly modify field maps from the map data store 208 and/or another storage location, or may communicate implement operation data to the field map analyzer 210, the field map generator 206, and/or the implement commander 220.

In operation, the field map handler 202 enables generation of field maps by analyzing location data using the location data analyzer 204, generating maps based on the location data using the field map generator 206, and storing the field maps for subsequent use in the map data store 208. When a vehicle 102 travels over a field that has been mapped, the field map analyzer 210 can analyze the existing map and determine crop row locations and other data to enable automated navigation and operation throughout the field. The user command accessor 212 can process a variety of commands from an operator via the user interface 122 or another component in the cab 106. The user interface configurator 214 communicates user interface data to the user interface 122 such that field maps and other data can be displayed on the user interface 122 for the operator. The equipment parameter determiner 216 determines parameters (e.g., a type of implement, an operational width of an implement, etc.) of the implement 108. The guidance line generator 218 utilizes field map(s) and/or equipment parameters to generate guidance lines for the vehicle 102, which are subsequently employed by the implement commander 220 and the drive commander 222 to enable automated navigation and operation of the vehicle 102. The operation performance tracker 224 monitors implement operation data to update field maps based on operations that have been performed.

While an example manner of implementing the controller 116 of FIG. 1 is illustrated in FIG. 2, one or more of the elements, processes and/or devices illustrated in FIG. 2 may be combined, divided, re-arranged, omitted, eliminated and/or implemented in any other way. Further, the example field map handler 202, the example location data analyzer 204, the example field map generator 206, the example map data store 208, the example field map analyzer 210, the example user command accessor 212, the example user interface configurator 214, the example equipment parameter determiner 216, the example guidance line generator 218, the example implement commander 220, the example drive commander 222, the example operation performance tracker 224 and/or, more generally, the example controller 116 of FIG. 2 may be implemented by hardware, software, firmware and/or any combination of hardware, software and/or firmware. Thus, for example, any of the example field map handler 202, the example location data analyzer 204, the example field map generator 206, the example map data store 208, the example field map analyzer 210, the example user command accessor 212, the example user interface configurator 214, the example equipment parameter determiner 216, the example guidance line generator 218, the example implement commander 220, the example drive commander 222, the example operation performance tracker 224 and/or, more generally, the example controller 116 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example field map handler 202, the example location data analyzer 204, the example field map generator 206, the example map data store 208, the example field map analyzer 210, the example user command accessor 212, the example user interface configurator 214, the example equipment parameter determiner 216, the example guidance line generator 218, the example implement commander 220, the example drive commander 222, the example operation performance tracker 224 and/or, more generally, the example controller 116 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example controller 116 of FIG. 3 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
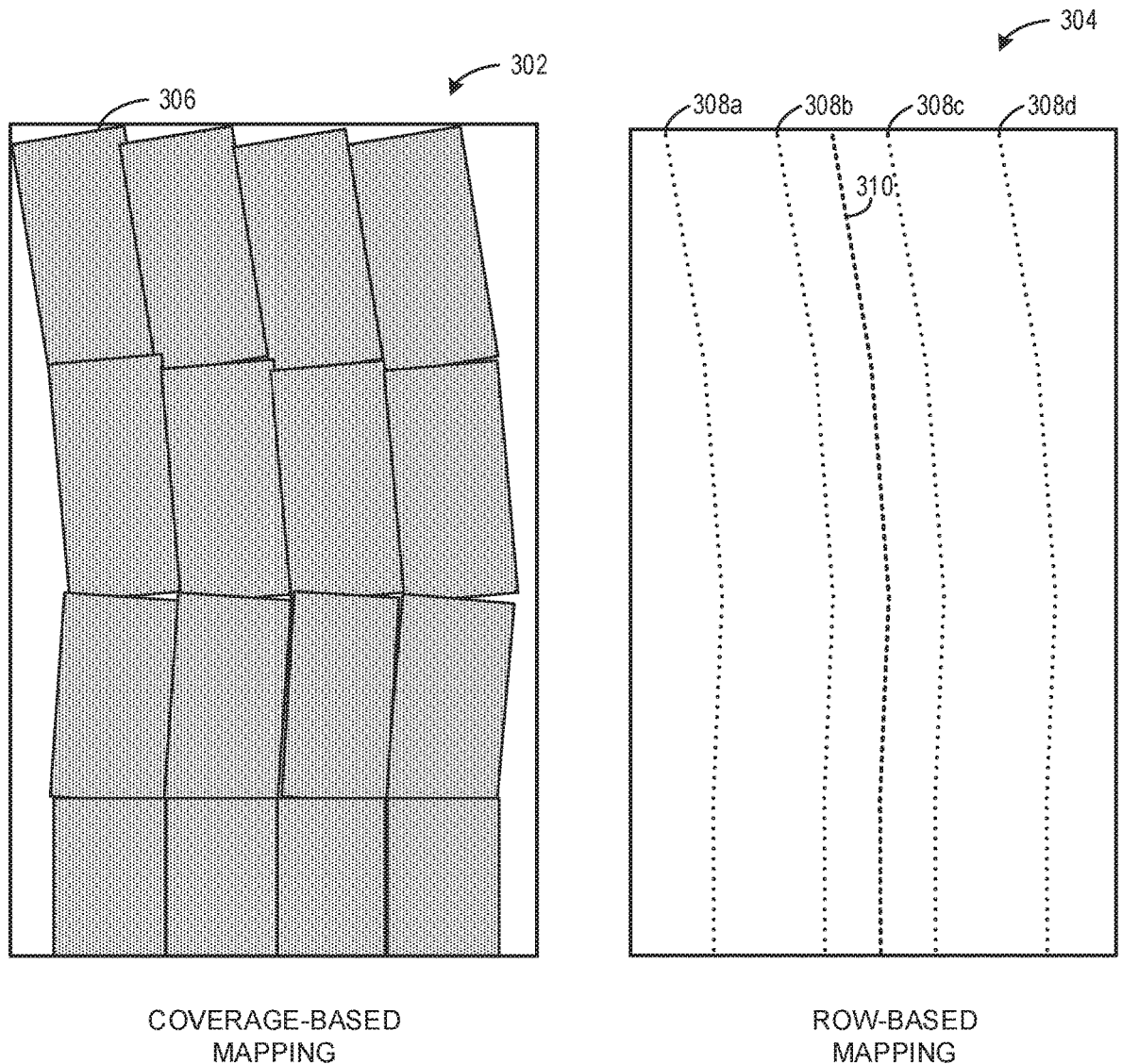
FIG. 3 is a schematic illustrating an example coverage-based mapping technique and an example row-based mapping technique.

FIG. 3 is a schematic illustrating an example coverage-based mapping technique and an example row-based mapping technique. The schematic includes an example coverage map 302 and an example row map 304. The example coverage map 302 includes shading on areas where an operation has been performed. In the example coverage map 302, rectangular areas are utilized as approximations of where the implement 108 performed an operation. During subsequent use of the coverage map 302 to generate guidance lines for autonomous operation of the vehicle 102, the guidance line generator 218 would not be able to identify locations of specific crop rows, as the coverage map 302 merely indicates generally where an operation was performed.

The example row map 304 of the illustrated example of FIG. 3 includes example crop row lines 308a-d, which illustrate precise locations of crop rows on the field. The row map 304 further includes an example guidance line 310, illustrating a path that the vehicle 102 followed or is to follow while traversing the field. The crop row lines 308a-d can be integrated in the field map by utilizing data from the operation performance tracker 224, the equipment parameter determiner 216, and/or the location data analyzer 204. For example, the location data analyzer 204 can determine a location of the vehicle 102 based on location data from the location sensor 114. Accurate positions of individual portions of the implement 108 can be determined by extrapolating the location data for the vehicle 102 based on a known width of the implement and a known location of the location sensor 114 relative to the implement 108. Finally, the operation performance tracker 224 can determine whether portions of the implement 108 were actually utilized during an operation, which therefore determines whether those crop rows should exist in a new field map. For example, if a map is generated during an initial planting operation, the crop row lines 308a-d should only be generated at locations of crop rows that are actually planted, according to the operation performance tracker 224.

Utilizing a row-based mapping technique allows subsequent generation of accurate guidance lines to perform an operation upon the crop rows using a different implement (which may have a different width) at a later time. Conversely, utilizing a coverage-based map which only depicts general areas which have been operated upon may result in guidance lines being generated that cause overlap of operations, damage to crops, and/or crop rows remaining untreated during subsequent operations.

FIG. 4A is an example field map 402 generated using an example four-row implement. The field map 402 of the illustrated example of FIG. 4A includes a plurality of example crop row lines 404 and a plurality of example original guidance lines 406. The crop row lines 404 accurately illustrate locations of crop rows on the field. For example, the crop row lines 404 can accurately represent crop row locations based on location data determined directly on the implement, therefore accounting for potential implement drift during the operation. The original guidance lines 4 depict a path that was followed by the vehicle which generated the field map. For each one of the original guidance lines 406, there are four crop row lines 404 distributed around the one of the original guidance lines 406, indicating that the implement of the original vehicle that performed the mapping had an operational width of four-rows. While only one of the crop row lines 404 and one of the original guidance lines 406 are labeled, all lines in FIGS. 4A-4F which have the same line type (using the same dashing pattern) are understood to refer to the same type of element.

FIG. 4B is an example first field map traversal schematic 408 using an example twelve-row sprayer 410 in a subsequent operation on the field corresponding to the field map 402 of FIG. 4A. The first field map traversal schematic 408 includes an example guidance line 412 for the twelve-row sprayer 410. The twelve-row sprayer 410 has an operational width that is three times larger than the operational width of the implement which performed the original operation. Thus, there is only the guidance line 412 in the first field map traversal schematic 408 in order for the twelve-row sprayer to perform a spraying operation on twelve of the crop row lines 404.

FIG. 4C is an example second field map traversal schematic 414 using an example eight-row sprayer 416 in a subsequent operation on the field corresponding to the field map 402 of FIG. 4A. The second field map traversal schematic 414 includes an example guidance line 418 for the eight-row sprayer 416. The eight-row sprayer 416 has an operational width that is two times larger than the operational width of the implement which performed the original operation. Thus, there is only the guidance line 418 in the second field map traversal schematic 414 in order for the eight-row sprayer 416 to perform a spraying operation on eight of the crop row lines 404.

FIG. 4D is an example third field map traversal schematic 420 using an example four-row harvester 422 in a subsequent operation on the field corresponding to the field map 402 of FIG. 4A. The third field map traversal schematic 420 includes example guidance lines 424 for the four-row harvester 422. While the guidance lines 424 of the third field map traversal schematic 420 substantially overlap the original guidance lines 406, in some examples, due to implement drift or other factors, the actual crop row locations may be different such that the guidance lines 424 are different from the original guidance lines 406 to best operate upon the crop rows, despite the operational width of the four-row harvester 422 being the same as the four-row implement of the original operation.

FIG. 4E is an example fourth field map traversal schematic 426 using an example two-row harvester 428 in a subsequent operation on the field corresponding to the field map 402 of FIG. 4A. The fourth field map traversal schematic 426 includes example guidance lines 430 for the two-row harvester 428. Since the two-row harvester 428 has an operational width that is half that of the four-row implement used in the original operation, there are twice as many of the guidance lines 430 in the fourth field map traversal schematic 426 relative to the original guidance lines 406.

FIG. 4F is an example fifth field map traversal schematic 432 using an example one-row harvester 434 in a subsequent operation on the field corresponding to the field map 402 of FIG. 4A. The fifth field map traversal schematic 432 includes example guidance lines 436 which are displayed directly over the crop row lines 404 of the field map 402, since the one-row harvester 434 must individually pass over each crop row to harvest the field. The one-row harvester 434 therefore requires four times as many guidance lines as the four-row implement used in the original operation.

FIG. 5A is an enlarged view of the example field map 402 of FIG. 4A generated using a four-row implement.

FIG. 5B is an example sixth field map traversal schematic 502 using an example single row harvester 504 with an example haulage vehicle 506 on a portion of the field corresponding to the field map 402 of FIG. 5A. The single row harvester 504 is a first implement which harvests the crop rows, and the haulage vehicle 506 is a second implement which is used to store the harvest during operation. Hence, the controller 116 must generate guidance lines for the vehicle based on operational widths and relative positioning of both the single row harvester 504 and the haulage vehicle 506. For clarity, the guidance lines for the single row harvester 504 and the haulage vehicle 506 are omitted from FIG. 5B, and instead illustrated with each of the implements individually in FIGS. 5C and 5D. While individual guidance lines are illustrated for each of the implements (the single row harvester 504 and the haulage vehicle 506) in FIGS. 5C, 5D, the controller (e.g., the guidance line generator 218) may generate a single guidance line for the overall vehicle to follow based on the individual guidance lines for the implements.

FIG. 5C is an example seventh field map traversal schematic 508 using the example single row harvester 504 of FIG. 5B on the field corresponding to the field map 402 of FIG. 5A. Since the single row harvester 504 is only capable of operating on one row at a time, example guidance lines 510 of FIG. 5C for the single row harvester 504 overlap on all crop rows of the field map 402 to ensure all crop rows are operated upon. While the guidance lines 510 of the illustrated example substantially overlap the original guidance lines 406, in some examples, even when the operational width of the vehicle implement performing the subsequent operation is the same as the operational width of the vehicle implement performing the original operation, the guidance lines may not overlap. For example, due to drift of the implement, crop row locations may not be evenly distributed around the original guidance line. In some such examples, when a subsequent operation is performed, the guidance lines may be generated in different locations than the original guidance lines to better target the actual locations of the crop rows. Thus, the benefit of having knowledge of specific locations of the crop rows can be realized even in examples where a subsequent vehicle has a same operational width as an original vehicle.

FIG. 5D is an example eighth field map traversal schematic 512 using the example haulage vehicle 506 of FIG. 5B on the field corresponding to the field map 402 of FIG. 5A. The eighth field map traversal schematic 512 includes example guidance lines 514 for the haulage vehicle 506. The guidance lines 514 of the illustrated example of FIG. 5D are generated (e.g., by the guidance line generator 218) such that wheels of the haulage vehicle 506 do not drive over the crop rows represented by the crop row lines 404. The haulage vehicle 506 does not perform an operation on the crop rows itself, but instead assists the single-row harvester 504. Hence, the guidance lines 514 of FIG. 5B are not generated to enable an operation on the crop rows, but to avoid damaging the crop rows (e.g., by driving over them with the haulage vehicle 506).

Figure 6B:
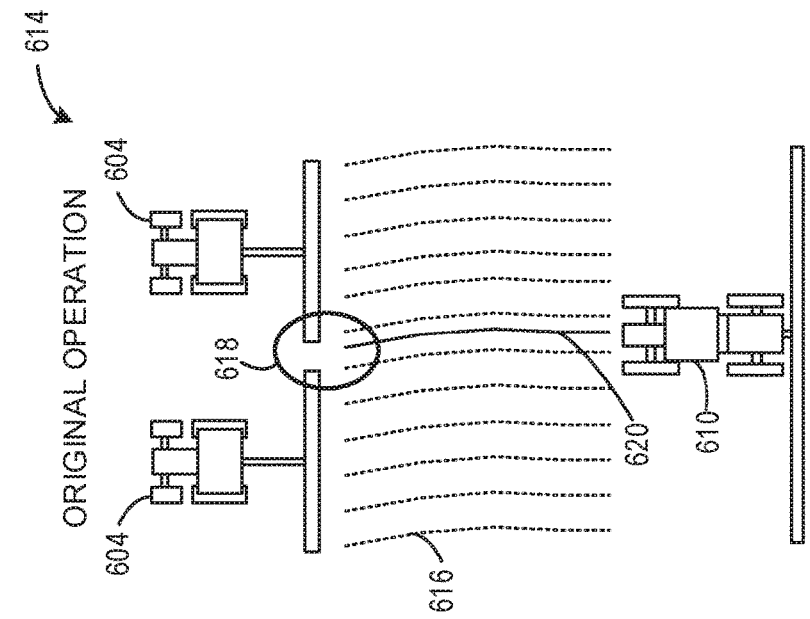
FIG. 6B is an example tenth field map traversal schematic illustrating another original operation and another subsequent operation executed on a field map with an accurate guess row.
Figure 6A:
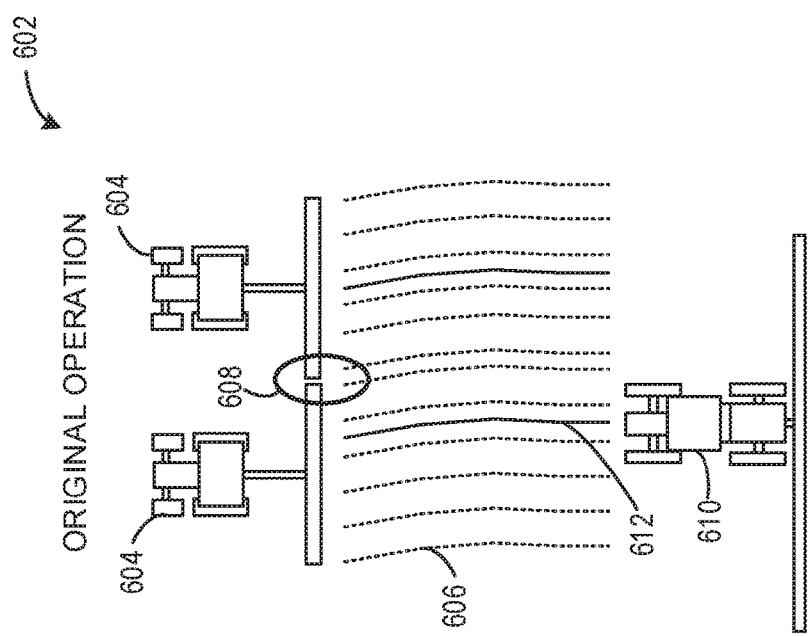
FIG. 6A is an example ninth field map traversal schematic illustrating an original operation and a subsequent operation executed on a field map with a narrow guess row.

FIG. 6A is an example ninth field map traversal schematic 602 illustrating an example original operation and an example subsequent operation executed on a field map with a narrow guess row. The ninth field map traversal schematic 602 includes an original vehicle 604 which performed the original operation and generate the field map. The two instances of the original vehicle 604 represents subsequent passes of the same original vehicle 604. The ninth field map traversal schematic 602 includes example crop row lines 606 indicating locations at which the crop rows were operated upon (e.g., planted) during the original operation. In the ninth field map traversal schematic 602, the original operation exhibited an example narrow guess row 608, meaning that outer crop rows from consecutive passes of the original vehicle 604 have a narrow spacing relative to other crop rows. Without accurate knowledge of the crop row locations (e.g., as provided by field maps generated using techniques disclosed herein), subsequent operations performed on the field may drive over the narrow guess row 608, and/or otherwise improperly operate upon the crop rows of the narrow guess row 608.

Utilizing field mapping techniques disclosed herein, a subsequent operation can accurately generate guidance lines to appropriately operate upon a field with a narrow guess row. For example, the ninth field map traversal schematic 602 includes an example subsequent vehicle 610 with a twelve-row implement. The twelve-row implement could theoretically operate upon all of the crop rows represented by the crop row lines 606, but to do so, the subsequent vehicle 610 would have to drive in the center of the crop rows, and may end up driving over the narrow guess row 608. To avoid this, example guidance lines 612 are generated accounting for the specific positions of the crop rows and the width of the implement of the subsequent vehicle 610. The example guidance lines 612 cause the subsequent vehicle 610 to travel between rows with regular widths, thus avoiding driving through the narrow guess row 608. In such examples, the implement commander 220 of the controller 116 can cause portions of the implement to be enabled and/or disabled based on whether crop rows beneath the implement have been operated upon. Based on the positioning of the guidance lines 612, utilizing all portions of the implement throughout the entire traversal would result in repeated operations, and hence, the implement must be selectively activated over rows which have not yet been operated upon.

FIG. 6B is an example tenth field map traversal schematic 614 illustrating another original operation and another subsequent operation executed on a field map with an accurate guess row. The tenth field map traversal schematic 614 includes the example original vehicle 604 and the example subsequent vehicle 610. In the tenth field map traversal schematic 614, the original operation is performed by the original vehicle 604 with example crop row lines 606 including an example accurate guess row 618 (e.g., a guess row where the spacing between outer crop rows operated upon by the original implement during consecutive passes are spaced approximately equally to other crop rows). In the illustrated example of FIG. 6B, the subsequent vehicle 610 utilizes an example guidance line 620 that is in between crop rows of the accurate guess row 618. The guidance line generator 218 of the illustrated example of FIG. 2 can generate the guidance line 620 centrally such that the twelve-row implement of the subsequent vehicle 610 can operate upon all of the twelve crops rows without the subsequent vehicle 610 running over any of the crop rows (e.g., as may happen utilizing the guidance line 620 of FIG. 6B with the narrow guess row of FIG. 6A. Hence, guidance lines generated for automated vehicle operation utilizing techniques disclosed herein enable accurate and efficient operation on afield regardless of unique spacing of crop rows (e.g., regardless of differently-sized guess rows, regardless of contours of the field, etc.).

Figure 7:
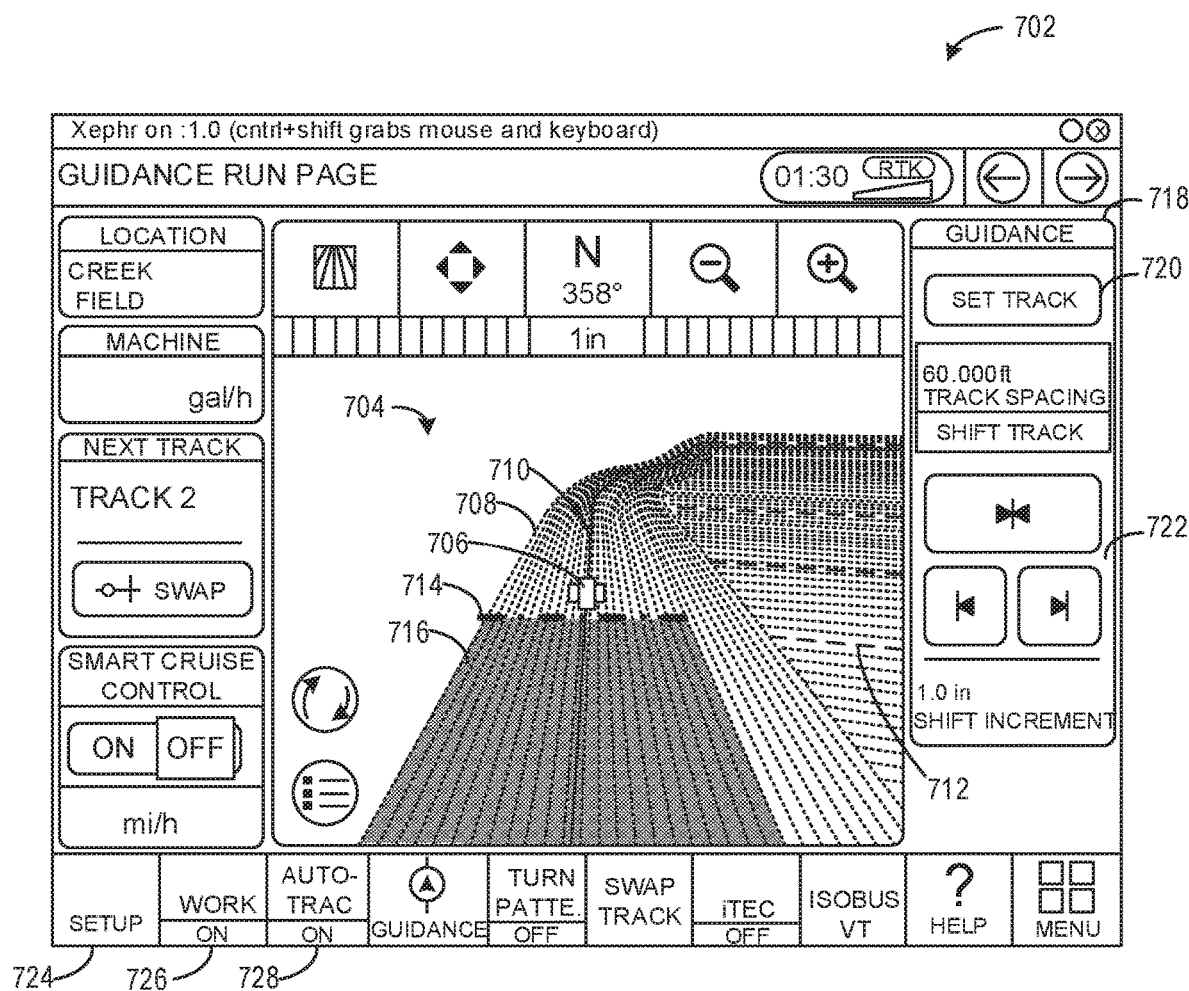
FIG. 7 is an example run screen to be displayed on an example user interface of the vehicle of FIG. 1.

FIG. 7 is an example run screen 702 to be displayed on the example user interface 122 of the vehicle 102 of FIG. 1. The example run screen 702 includes an example navigation display portion 704 to display mapping data, guidance lines, crop row locations, and/or other information pertinent to navigation of the vehicle 102.

The navigation display portion 704 includes an example vehicle position indicator 706 displaying a current position of the vehicle 102 relative to the field illustrated in the navigation display portion 704.

The navigation display portion 704 further includes example crop row lines 708, illustrating precise locations of crop rows, as determined from a previously generated field map (e.g., generated by the field map generator 206 during an initial operation).

The navigation display portion 704 includes an example current guidance line 710 (displayed as a solid line) that the vehicle 102 is following during its automated operation on the field. In some examples, the current guidance line 710 is generated by the guidance line generator 218 of the controller 116 of FIG. 2. Similarly, the navigation display portion 704 includes example past or future guidance lines 712, which indicate guidance lines that are either not yet being followed or were already followed during previous operation.

The navigation display portion 704 includes an example implement position line 714, indicating a current position and operational width of the implement 108. Behind the implement (e.g., under the implement, in the view of FIG. 7) on the field is an example coverage section 716. The coverage section 716 provides shading for areas which have been operated upon by the implement 108. In some examples, the operation performance tracker 224 indicates portions of the implement 108 which have been enabled throughout an operation. In some such examples, this implement operation data can be combined with location data indicating a position of the implement 108 to plot the coverage section 716.

The run screen 702 of the illustrated example of FIG. 7 includes an example guidance portion 718. The guidance portion 718 includes an example set track button 720 to allow an operate to determine a track (e.g., one or more guidance lines) for the vehicle 102 to follow. In some examples, the tracks (e.g., the plurality of guidance lines) are determined automatically based on a location of the vehicle 102 and existing field maps. In some examples, the set track button 720 allows the user to select a guidance line and/or begin the process of manually creating a new guidance line (e.g., in the absence of mapping data). The guidance portion 718 further includes an example track adjustment portion 722 to enable manual adjustments of the guidance line. For example, if the current guidance line 710 appears to be problematic (e.g., the operator notices that the vehicle 102 is driving over a crop row), the operator can manually shift a position of the current guidance line 710.

The run screen 702 of the illustrated example of FIG. 7 further includes an example setup button 724. The setup button 724, when pressed, allows an operator to adjust parameters of the vehicle 102 and/or the implement 108. For example, if the implement 108 does not automatically communicate parameters (e.g., an operational width, an implement type, etc.) to the controller 116, the operator can enter these parameters into a prompt provided when the setup button 724 is pressed.

The run screen 702 of the illustrated example of FIG. 7 includes an example work recording button 726. When actuated to "on," as shown in the illustrated example of FIG. 7, the controller 116 records implement operation data, thereby enabling generation of the coverage section 716. In some examples, the operation performance tracker 224 communicates operation performance data to the map data store 208, the field map analyzer 210, and/or the field map generator 206, such that the coverage section 716 can be stored in the field map and accessed by an operator to view portions of the field which have been operated upon.

The run screen 702 of the illustrated example of FIG. 7 includes an example auto-trac button 728, which allows an operator to enable or disable automated guidance of the vehicle 102 and/or automated operation of the implement 108. Since the auto-trac button is listed as enabled in FIG. 7, the vehicle 102 is operating in an automated mode, automatically generating and following guidance lines and performing operations with the implement 108 based on existing field maps.

Figure 8:
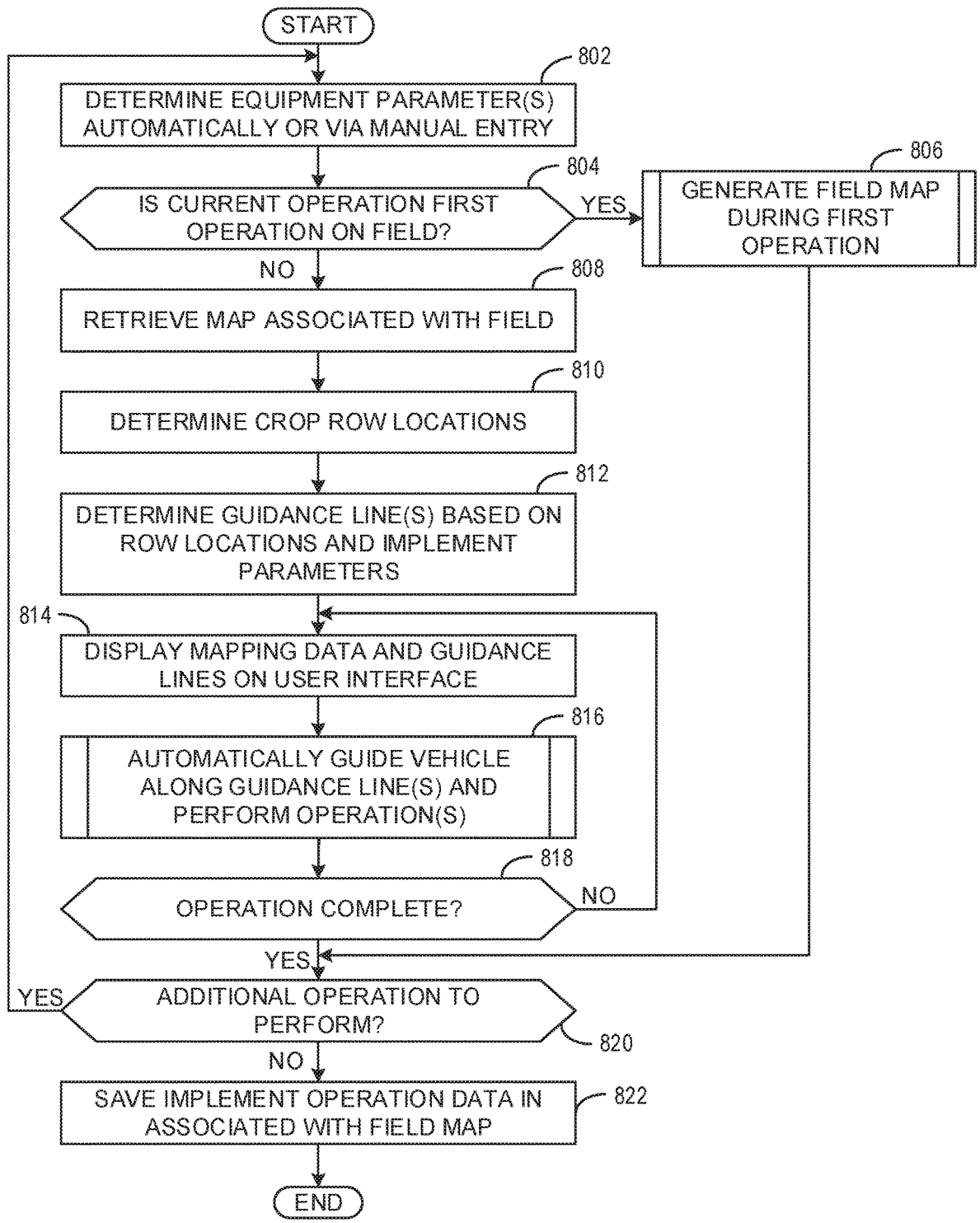
FIG. 8 is a flowchart representative of example machine readable instructions that may be executed to implement the controller of FIGS. 1 and 2 to perform an operation on a field using a field map.
Figure 9:
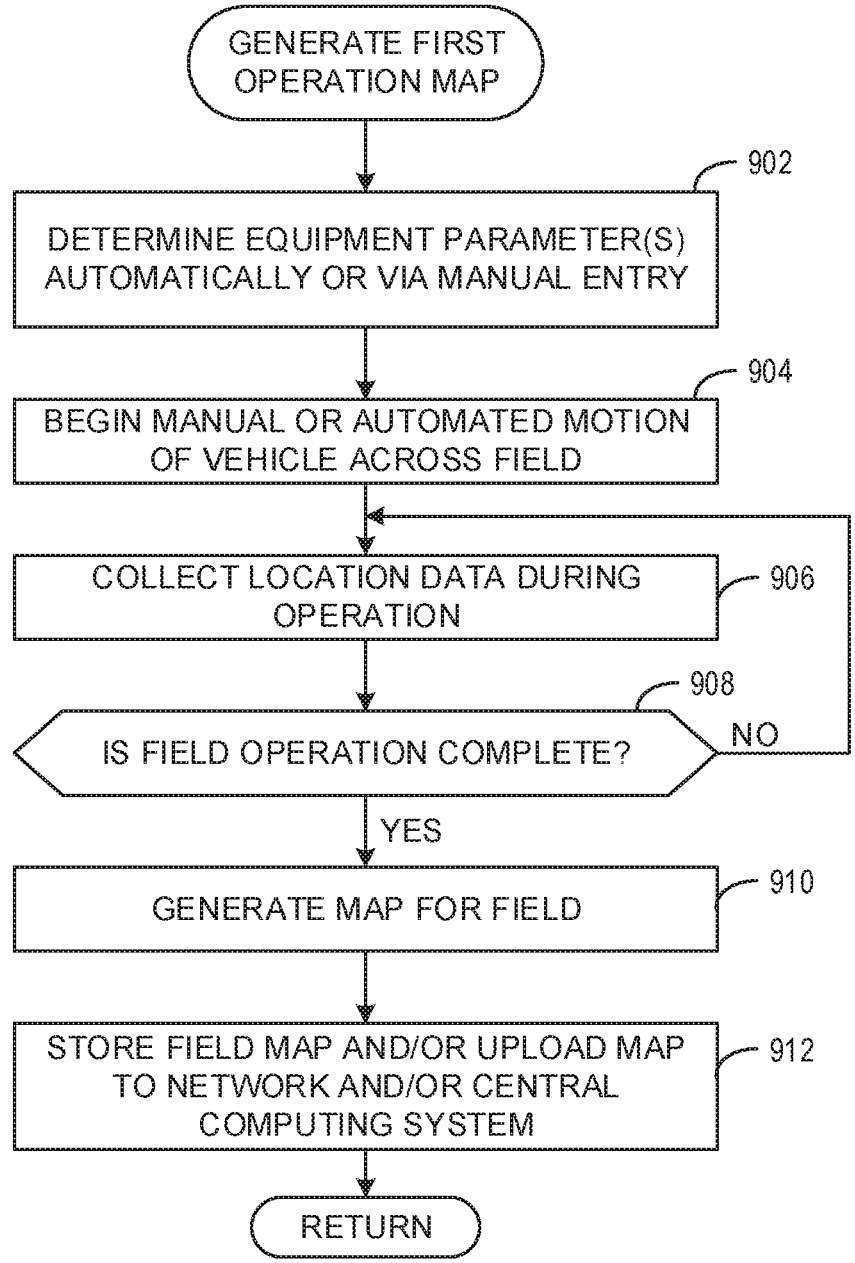
FIG. 9 is a flowchart representative of example machine readable instructions that may be executed to implement the controller of FIGS. 1 and 2 to generate a first operation map.
Figure 10:
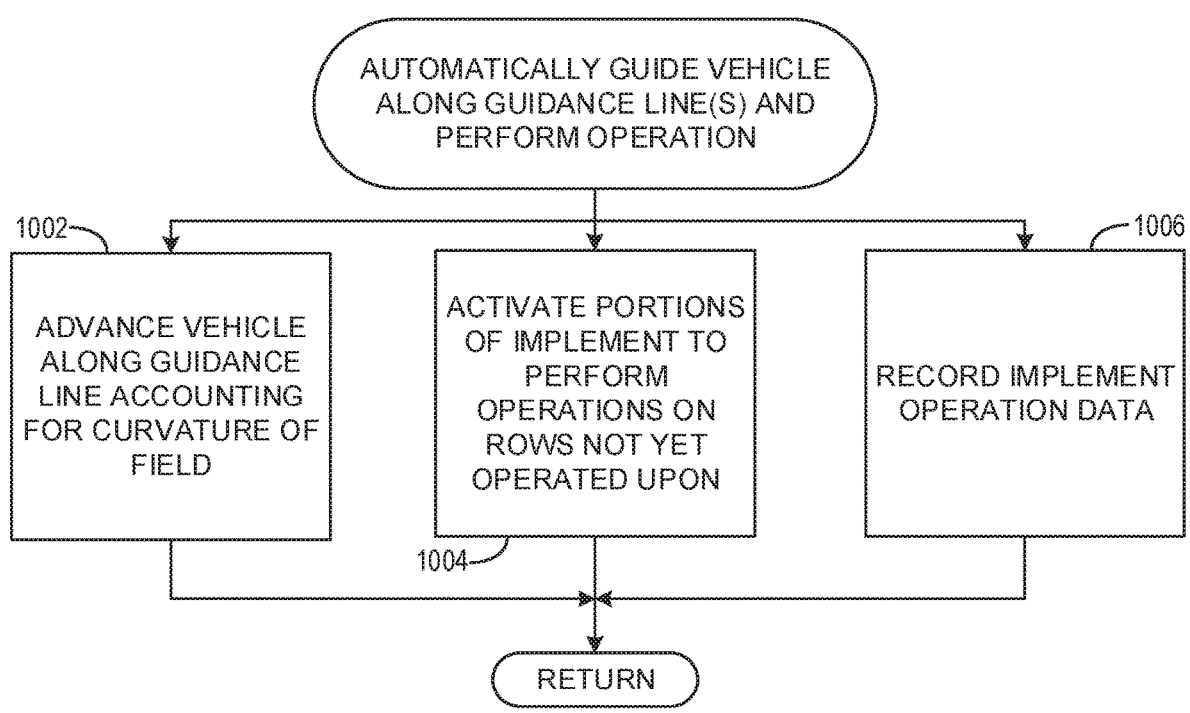
FIG. 10 is a flowchart representative of example machine readable instructions that may be executed to implement the controllers of FIGS. 1 and 2 to automatically guide a vehicle along guidance line(s) and perform an operation on a field.

Flowcharts representative of example hardware logic, machine readable instructions, hardware implemented state machines, and/or any combination thereof for implementing the controller 116 of FIGS. 1 and 2 are shown in FIGS. 8-10. The machine readable instructions may be one or more executable programs or portion(s) of an executable program for execution by a computer processor such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 8-10, many other methods of implementing the example controller 116 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 8-10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B. (5) A with C. (6) B with C, and (7) A with B and with C. As used herein in the context of describing structures, components, items, objects and/or things, the phrase "at least one of A and B" is intended to refer to implementations including any of (1) at least one A, (2) at least one B. and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B and (3) at least one A and at least one B.

Example machine readable instructions 800 that may be executed by the controller 116 to perform an operation on a field using a field map are illustrated in FIG. 8. With reference to the preceding figures and associated description, the example machine readable instructions 800 begin with the example controller 116 determining equipment parameter(s) automatically or via manual entry (Block 802). In some examples, the equipment parameter determiner 216 determines equipment parameter(s) automatically (e.g., based on data from the implement 108 and/or from the implement sensors 112a-1), and/or via manual entry (e.g., via entry from the operator on the user interface 122).

At block 804, the example controller 116 determines if the current operation is the first operation on the field. In some examples, the field map analyzer 210 determines if the current operation is the first operation on the field by comparing a location of the vehicle 102, as determined by the location data analyzer 204, with existing field maps in the map data store 208. If a field map exists, then the current operation is not the first operation on the field. Conversely, if a field map does not exist, the current operation is the first operation on the field. In response to the current operation being the first operation on the field, processing transfers to block 806. Conversely, in response to the current operation not being the first operation on the field, processing transfers to block 808.

At block 806, the example controller 116 generates a field map during a first operation. Further detail of the implementation of block 806 is illustrated and described below in connection with FIG. 9.

At block 808, the example controller 116 retrieves a map associated with the field. In some examples, the field map analyzer 210 retrieves a field map from the map data store 208 and/or form another location (e.g., a network location) accessible to the controller 116.

At block 810, the example controller 116 determines crop row locations. In some examples, the field map analyzer 210 determines crop row locations based on the field map. In some examples, the field map analyzer 210 determines crop row locations based on the field map and historical implement operation data, as analyzed by the operation performance tracker 224.

At block 812, the example controller 116 determines guidance line(s) based on crop row locations and implement parameters. In some examples, the guidance line generator 218 generates guidance lines based on crop row locations from the field map analyzer 210 and implement parameters from the equipment parameter determiner 216. For example, the guidance line generator 218 can utilize a known operational width of the implement 108 to generate guidance lines to perform an operation upon the crop rows.

At block 814, the example controller 116 displays mapping data and a guidance line on the user interface 122. In some examples, the user interface configurator causes the user interface 122 to display mapping data (e.g., a field map) and a guidance line on the user interface 122. An example of such mapping data and a guidance line displayed on the user interface 122 is illustrated by the run screen 702 of FIG. 7.

At block 816, the example controller 116 automatically guides the vehicle 102 along guidance line(s) and perform operation(s). Further detail of the implementation of block 816 is illustrated and described below in connection with FIG. 10.

At block 818, the example controller 116 determines whether the operation is complete. In some examples, the user command accessor 212 determines, based on user commands entered on the user interface 122, whether the operation is complete. In some examples, the operation performance tracker 224 determines, based on implementation operation data and a location of the vehicle 102, whether the operation is complete. In response to the operation being complete, processing transfers to block 820. Conversely, in response to the operation not being complete, processing transfers to block 814.

At block 820, the example controller 116 determines whether there is an additional operation to perform. In some examples, the user command accessor 212 determines, based on user commands, whether there is an additional operation to perform on the field. In response to there being an additional operation to perform, processing transfers to block 802. Conversely, in response to there not being an additional operation to perform, processing transfers to block 822.

At block 822, the example controller 116 saves implement operation data in association with the field map. In some examples, the operation performance tracker 242, the field map analyzer 210, the field map generator 206, and/or the map data store 208 save implement operation data in association with the field map.

Example machine readable instructions 900 that may be executed by the controller 116 to generate a first operation map are illustrated in FIG. 9. With reference to the preceding figures and associated description, the example machine readable instructions 900 begin with the example controller 116 determining equipment parameter(s) automatically or via manual entry. In some examples, the equipment parameter determiner 216 determines equipment parameter(s) automatically (e.g., based on data from the implement 108 and/or from the implement sensors 112a-l), and/or via manual entry (e.g., via entry from the operator on the user interface 122).

At block 904, the example controller 116 begins manual or automated motion of the vehicle 102 across the field. In some examples, the operator controls motion of the vehicle 102 by commanding the drive commander 222, and controls usage of the implement 108 by commanding the implement commander 220. In some examples, the controller 116 automatically operates the vehicle via the drive commander 222 and the implement commander 220 by generating general guidance lines (e.g., evenly spaced, linear guidance lines) based on a field dimension and continually operating upon the field with all portions of the implement 108 via the implement commander 220.

At block 906, the example controller 116 collects location data during operation. In some examples, the location data analyzer 204 collects GPS data and inertial data from the location sensor 114 during operation of the vehicle 102.

At block 908, the example controller 116 determines if the field operation is complete. In some examples, the user command accessor 212 determines, based on user commands entered into the user interface 122, whether the field operation is complete. In response to the field operation being complete, processing transfers to block 910. Conversely, in response to the field operation not being complete, processing transfers to block 906.

At block 910, the example controller 116 generates a map for the field which has been operated upon. In some examples, the field map generator 206 generates a map for the field. For example, the field map generator 206 can generate the map based on location data from the location data analyzer 204 and/or implement operation data from the operation performance tracker 224.

At block 912, the example controller 116 stores the field map and/or uploads the field map to a network and/or central computing system. In some examples, the map data store 208 is used to store the field map.

Example machine readable instructions 100 that may be executed by the controller 116 to automatically guide a vehicle along guidance line(s) and perform an operation on a field are illustrated in FIG. 10. With reference to the preceding figures and associated description, the example machine readable instructions 1000 begin with the example controller 116 advancing the vehicle 102 along a guidance line accounting for curvature and/or contour of the field (Block 1002). In some examples, the drive commander 222 causes the vehicle 102 to advance along the guidance line through the field.

At block 1004, the example controller 116 activates portions of the implement 108 to perform operations on rows which have not been operated upon. In some examples, the implement commander 220 activates (e.g., enables, causes use of, etc.) portions of the implement 108 to perform operations on crop rows which have not yet been operated upon, based on implement operation data as analyzed by the operation performance tracker 224 and based on the field map, as analyzed by the field map analyzer 210.

At block 1006, the example controller 116 records implement operation data. In some examples, the operation performance tracker 224 records implement operation data by storing it in association with a field map of the current field being operated upon in the map data store 208.

Figure 11:
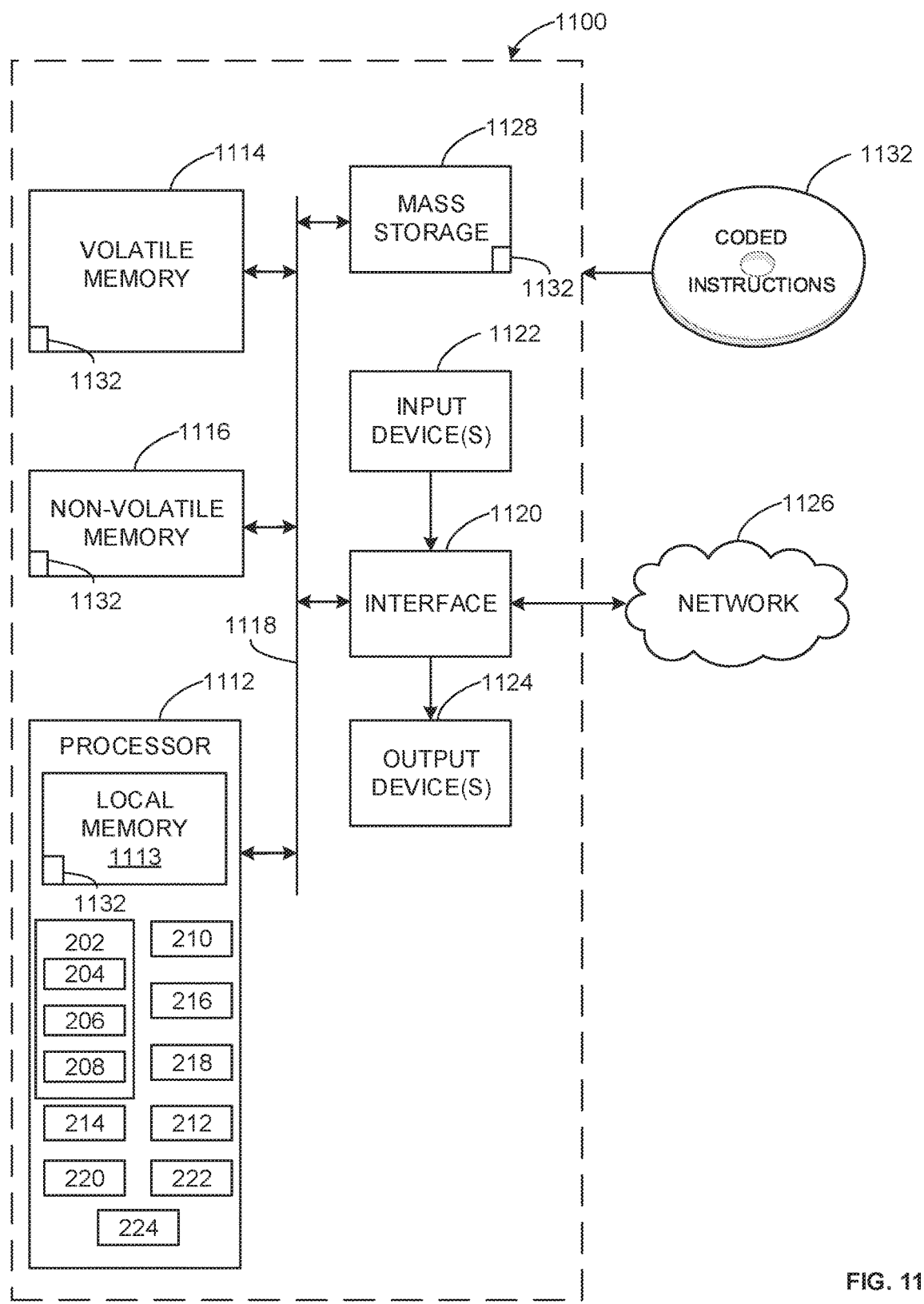
FIG. 11 is a block diagram of an example processing platform structured to execute the example machine readable instructions of FIGS. 8-10 to implement the controller of FIGS. 1 and 2. The figures are not to scale. In general, the same reference numbers will be used throughout the drawing(s) and accompanying written description to refer to the same or like parts.

FIG. 11 is a block diagram of an example processor platform 1100 structured to execute the instructions of FIGS. 8-10 to implement the controller 116 of FIGS. 1 and 2. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example field map handler 202, the example location data analyzer 204, the example field map generator 206, the example map data store 208, the example field map analyzer 210, the example user command accessor 212, the example user interface configurator 214, the example equipment parameter determiner 216, the example guidance line generator 218, the example implement commander 220, the example drive commander 222, and the example operation performance tracker 224.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIGS. 1 and 2 may be stored in the mass storage device 1128, in the volatile memory 1114, in the non-volatile memory 1116, and/or on a removable non-transitory computer readable storage medium such as a CD or DVD.

From the foregoing, it will be appreciated that example methods, apparatus and articles of manufacture have been disclosed that enable accurate automated operation of an agricultural vehicle to perform operations on a field by utilizing field mapping data to generate guidance lines that account for differences between types of implements, unique topographical features of the field, unique crop row geometries, and/or other factors.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a guidance line generator to generate a guidance line for operation of a vehicle during a second operation on a field, the guidance line based on (1) a field map generated from location data collected during a first operation in the field, the field map including locations of a plurality of crop rows, the locations of the plurality of crop rows determined based on an implement path travelled by an implement of the vehicle during the first operation, the implement path different from a vehicle path of the vehicle during the first operation, the location data from an implement sensor mounted on the implement, and (2) the implement to perform the second operation on the field;
a drive commander to cause the vehicle to traverse the field along the guidance line; and
an implement commander to cause the implement to perform the second operation as the vehicle traverses the field along the guidance line.

2. The apparatus of claim 1, wherein the guidance line generator is to generate the guidance line based on an operational width of the implement.

3. The apparatus of claim 1, wherein the implement commander is to cause portions of the implement to perform the second operation upon crop rows which have not been operated upon.

4. The apparatus of claim 1, wherein the first operation is at least one of a planting operation or a strip till operation, and the second operation is an operation that follows the first operation.

5. The apparatus of claim 1, further including an operation performance tracker to store operation performance data, the operation performance data indicating locations at which the second operation was performed by the implement.

6. The apparatus of claim 1, wherein the guidance line is to account for at least one of a curvature or contour of the field.

7. The apparatus of claim 1, further including an equipment parameter determiner to determine an operational width of the implement based on a signal from the implement or a manual input from an operator into a user interface.

8. The apparatus of claim 1, further including a user interface configurator to cause a user interface in a cab of the vehicle to display a portion of the field map and the guidance line.

9. The apparatus of claim 1, wherein the field map is generated based on GPS data, inertial data, and implement sensor data during the first operation.

10. The apparatus of claim 1, wherein the guidance line is to prevent the second operation on portions of the field on which the second operation has been performed.

11. A computer readable storage medium comprising computer readable instructions that, when executed, cause a processor to:
  generate a guidance line for operation of a vehicle during a second operation on a field, the guidance line based on (1) a field map generated from location data collected during a first operation in the field, the field map including locations of a plurality of crop rows, the locations of the plurality of crop rows determined based on an implement path travelled by an implement of the vehicle during the first operation, the implement path different from a vehicle path of the vehicle during the first operation, the location data from an implement sensor mounted on the implement, and (2) the implement of the vehicle, the implement to perform the second operation on the field;
  cause the vehicle to traverse the field along the guidance line; and
  cause the implement to perform the second operation as the vehicle traverses the field along the guidance line.

12. The computer readable storage medium of claim 11, wherein generating the guidance line is based on an operational width of the implement.

13. The computer readable storage medium of claim 11, wherein the instructions, when executed, cause the processor to cause portions of the implement to perform the second operation upon crop rows which have not been operated upon.

14. The computer readable storage medium of claim 11, wherein the first operation is at least one of a planting operation or a strip till operation, and the second operation is an operation that follows the first operation.

15. The computer readable storage medium of claim 11, wherein the instructions, when executed, further cause the processor to store operation performance data, the operation performance data indicating locations at which the second operation was performed by the implement.

16. The computer readable storage medium of claim 11, wherein the guidance line is to account for at least one of a curvature or contour of the field.

17. A method comprising:
  generating a guidance line for operation of a vehicle during a second operation on a field, the guidance line based on (1) a field map generated from location data collected during a first operation in the field, the field map including locations of a plurality of crop rows, the locations of the plurality of crop rows determined based on an implement path travelled by an implement of the vehicle during the first operation, the implement path different from a vehicle path of the vehicle during the first operation, the location data from an implement sensor mounted on the implement, and (2) the implement to perform the second operation on the field;
  causing the vehicle to traverse the field along the guidance line; and
  causing the implement to perform the second operation as the vehicle traverses the field along the guidance line.

18. The method of claim 17, wherein generating the guidance line is based on an operational width of the implement.

19. The method of claim 17, further including causing portions of the implement to perform the second operation upon crop rows which have not been operated upon.

20. The method of claim 17, wherein the first operation is at least one of a planting operation or a strip till operation, and the second operation is at least one of a spraying operation, a harvesting operation, a fertilizing operation, a planting operation, a strip till operation, or a planting without till operation.

21. The method of claim 17, wherein the guidance line is to account for curvature of the field.

22. An apparatus comprising:
  memory;
  instructions in the memory; and
  processor circuitry to execute the instructions to:
    generate a guidance line for operation of a vehicle during a second operation on a field, the guidance line based on (1) a field map generated from location data collected during a first operation in the field, the field map including locations of a plurality of crop rows, the locations of the plurality of crop rows determined based on an implement path travelled by an implement of the vehicle during the first operation, the implement path different from a vehicle path of the vehicle during the first operation, the location data from an implement sensor mounted on the implement, and (2) the implement to perform the second operation on the field;
    cause the vehicle to traverse the field along the guidance line; and
    cause the implement to perform the second operation as the vehicle traverses the field along the guidance line.

23. The apparatus of claim 22, wherein the processor circuitry is to execute the instructions to generate the guidance line based on an operational width of the implement.

24. The apparatus of claim 22, wherein the processor circuitry is to execute the instructions to cause portions of the implement to perform the second operation upon crop rows which have not been operated upon.

25. The apparatus of claim 22, wherein the first operation is at least one of a planting operation or a strip till operation, and the second operation is at least one of a spraying operation, a harvesting operation, a fertilizing operation, a planting operation, a strip till operation, or a planting without till operation.

26. The apparatus of claim 22, wherein the guidance line is to account for curvature of the field.

* * * * *